US009595157B2

(12) United States Patent
Rasmussen et al.

(10) Patent No.: US 9,595,157 B2
(45) Date of Patent: *Mar. 14, 2017

(54) WAGERING GAME WITH SIMULATED MECHANICAL REELS

(71) Applicant: WMS Gaming Inc., Waukegan, IL (US)

(72) Inventors: James M. Rasmussen, Chicago, IL (US); Timothy J. Durham, Oak Park, IL (US); Mark B. Gagner, West Chicago, IL (US); Alfred Thomas, Las Vegas, NV (US); Vladimir I. Arezina, River Forest, IL (US); Stephen A. Canterbury, Antioch, IL (US); Victor Mercado, Berwyn, IL (US); Samuel D. Ralston, Chicago, IL (US); Matthew R. Fitzsimons, Lake In The Hills, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 50 days.

This patent is subject to a terminal disclaimer.

(21) Appl. No.: 14/282,703

(22) Filed: May 20, 2014

(65) Prior Publication Data

US 2014/0274298 A1 Sep. 18, 2014

Related U.S. Application Data

(63) Continuation of application No. 11/937,740, filed on Nov. 9, 2007, which is a continuation-in-part of (Continued)

(51) Int. Cl.

| | |
|---|---|
| ***A63F 13/00*** | (2014.01) |
| ***G07F 17/32*** | (2006.01) |
| ***G07F 17/34*** | (2006.01) |

(52) U.S. Cl.
CPC ...... *G07F 17/3213* (2013.01); *G07F 17/3211* (2013.01); *G07F 17/34* (2013.01)

(58) Field of Classification Search
CPC ... G07F 17/3213; G07F 17/34; G07F 17/3211
(Continued)

(56) References Cited

U.S. PATENT DOCUMENTS

| | | | |
|---|---|---|---|
| 4,306,768 | A | 12/1981 | Egging |
| 4,448,419 | A | 5/1984 | Telnaes |

(Continued)

FOREIGN PATENT DOCUMENTS

| | | | | |
|---|---|---|---|---|
| EP | 0 060 019 | A1 | 9/1982 | ............. G07F 17/34 |
| EP | 0 789 338 | A1 | 8/1997 | ............. G07F 17/32 |

(Continued)

OTHER PUBLICATIONS

"Big Games Safari" Product Sheet, IGT, 24 pages (2000).

(Continued)

*Primary Examiner* — Kang Hu
*Assistant Examiner* — Thomas H Henry
(74) *Attorney, Agent, or Firm* — Nixon Peabody LLP

(57) ABSTRACT

A gaming machine for playing a wagering game includes a housing having a display region. A first image display device for simulating mechanical reels of a slot machine in the display region includes a curved surface that approximates the radius of curvature of a mechanical reel. The curved surface displays first video images that include a plurality of symbols indicating a randomly selected outcome of the wagering game. A second image display device displays second video images spatially separated from and overlaying the first video images within the display region. The second video images include indicia related to the wagering game.

30 Claims, 25 Drawing Sheets

Related U.S. Application Data application No. 11/847,560, filed on Aug. 30, 2007, now Pat. No. 7,654,899, which is a continuation-in-part of application No. PCT/US2007/015185, filed on Jun. 29, 2007.

(60) Provisional application No. 60/818,127, filed on Jun. 30, 2006, provisional application No. 60/876,917, filed on Dec. 22, 2006, provisional application No. 60/959,130, filed on Jul. 11, 2007.

(58) Field of Classification Search
USPC ......... 353/30, 79, 74, 82, 89, 121, 441–461; 345/1.1, 173–178, 905, 32, 40; 348/744, 348/750, 756–761, 766; 349/5, 8, 15
See application file for complete search history.

(56) References Cited

U.S. PATENT DOCUMENTS 4,454,670 A 6/1984 Bachmann et al.
4,517,558 A 5/1985 Davids
4,568,928 A 2/1986 Biferno
4,718,672 A 1/1988 Okada
4,875,144 A 10/1989 Wainwright
5,152,529 A 10/1992 Okada
5,283,560 A 2/1994 Bartlett
5,283,673 A 2/1994 Murase et al.
5,351,966 A 10/1994 Tohyama et al.
5,375,043 A 12/1994 Tokunaga
5,393,061 A 2/1995 Manship et al.
RE35,188 E 3/1996 Howard
5,580,055 A 12/1996 Hagiwara
5,643,086 A 7/1997 Alcorn et al.
5,697,843 A 12/1997 Manship et al.
5,722,891 A 3/1998 Inoue
5,725,210 A 3/1998 Yamaguchi et al.
5,752,881 A 5/1998 Inoue
D395,463 S 6/1998 Scott et al.
5,758,875 A 6/1998 Giacalone, Jr.
5,800,264 A 9/1998 Pascal et al.
5,810,665 A 9/1998 Takemoto et al.
5,871,400 A 2/1999 Yfantis
5,873,645 A 2/1999 Belfer
5,890,962 A 4/1999 Takemoto
5,934,672 A 8/1999 Sines et al.
5,967,893 A 10/1999 Lawrence et al.
5,971,851 A 10/1999 Pascal et al.
5,980,384 A 11/1999 Barrie
6,027,115 A 2/2000 Griswold et al.
6,036,188 A 3/2000 Gomez et al.
6,038,188 A 3/2000 Akamatsu
6,056,642 A 5/2000 Bennett
6,068,552 A 5/2000 Walker et al.
6,086,066 A 7/2000 Takeuchi et al.
6,089,977 A 7/2000 Bennett
6,095,921 A 8/2000 Walker et al.
6,106,396 A 8/2000 Alcorn et al.
6,135,884 A 10/2000 Hedrick et al.
6,135,885 A 10/2000 Lermusiaux
6,149,522 A 11/2000 Alcorn et al.
6,164,645 A 12/2000 Weiss
6,181,301 B1 1/2001 Inoguchi et al.
6,193,606 B1 2/2001 Walker et al.
6,193,607 B1 2/2001 Kay
6,196,547 B1 3/2001 Pascal et al.
6,224,482 B1 5/2001 Bennett
6,241,607 B1 6/2001 Payne et al.
6,251,013 B1 6/2001 Bennett
6,261,177 B1 7/2001 Bennett
6,270,411 B1 8/2001 Gura et al.
6,275,586 B1 8/2001 Kelly
6,287,202 B1 9/2001 Pascal et al.
6,290,600 B1 9/2001 Glasson
6,311,974 B1 11/2001 Koga
6,348,905 B1 2/2002 Wang
6,364,766 B1 4/2002 Anderson et al.
6,368,216 B1 4/2002 Hedrick et al.
6,375,568 B1 4/2002 Roffman et al.
6,409,170 B1 6/2002 Sugimoto
6,419,579 B1 7/2002 Bennett
6,431,586 B1 8/2002 Eyrainer et al.
6,443,586 B1 9/2002 Azima et al.
6,471,387 B1 10/2002 Henshaw et al.
6,497,617 B1 12/2002 Yoshida
6,502,116 B1 12/2002 Kelly et al.
6,517,432 B1 2/2003 Jaffe
6,517,433 B2 2/2003 Loose et al.
6,592,238 B2 7/2003 Cleaver et al.
6,629,184 B1 9/2003 Berg et al.
6,676,511 B2 1/2004 Payne et al.
6,729,618 B1 5/2004 Koenig et al.
6,742,776 B2 6/2004 Monsoon et al.
6,817,946 B2 11/2004 Motegi et al.
6,837,790 B1 1/2005 Kaminkow
6,863,606 B1 3/2005 Berg et al.
6,937,298 B2 8/2005 Okada
6,966,934 B1 11/2005 Sato et al.
7,097,560 B2 8/2006 Okada
7,140,963 B2 11/2006 Kojima
7,159,865 B2 1/2007 Okada
7,160,187 B2 1/2007 Loose et al.
7,166,029 B2 1/2007 Enzminger
7,204,753 B2 4/2007 Ozaki et al.
7,255,643 B2 8/2007 Ozaki et al.
7,452,276 B2 11/2008 Loose et al.
7,654,899 B2 2/2010 Durham et al.
7,841,944 B2 11/2010 Wells
7,942,745 B2 5/2011 Ikeda et al.
7,959,302 B2 6/2011 Nakamura et al.
8,096,878 B2 1/2012 Durham et al.
8,128,477 B2 3/2012 Durham et al.
8,192,281 B2 6/2012 Williams et al.
8,251,795 B2 8/2012 Durham et al.
8,403,743 B2 3/2013 Pacey et al.
8,472,526 B2 * 6/2013 Gomila et al. ........... 375/240.18
2001/0000636 A1 5/2001 Weiss
2001/0024970 A1 9/2001 McKee et al.
2001/0031658 A1 10/2001 Ozaki et al.
2002/0028707 A1 3/2002 Pascal et al.
2002/0045482 A1 * 4/2002 Poole ............................. 463/31
2002/0173354 A1 11/2002 Winas et al.
2002/0175466 A1 11/2002 Loose et al.
2003/0032479 A1 2/2003 Lemay et al.
2003/0060269 A1 3/2003 Paulsen et al.
2003/0064814 A1 4/2003 Stephan et al.
2003/0087690 A1 5/2003 Loose et al.
2003/0119577 A1 6/2003 Motegi et al.
2003/0144051 A1 7/2003 Gauselmann
2003/0157980 A1 8/2003 Loose et al.
2003/0234489 A1 12/2003 Okada
2003/0236118 A1 12/2003 Okada
2004/0014520 A1 1/2004 Okada
2004/0029636 A1 2/2004 Wells
2004/0053663 A1 3/2004 Paulsen et al.
2004/0053685 A1 3/2004 Seelig et al.
2004/0063490 A1 4/2004 Okada
2004/0082384 A1 4/2004 Walker et al.
2004/0102241 A1 5/2004 Kaminkow
2004/0116178 A1 6/2004 Okada
2004/0147303 A1 7/2004 Imura et al.
2004/0150162 A1 8/2004 Okada
2004/0152502 A1 8/2004 Okada
2004/0166925 A1 8/2004 Emori et al.
2004/0166926 A1 8/2004 Adachi et al.
2004/0171418 A1 9/2004 Okada
2004/0192430 A1 9/2004 Burak et al.
2004/0198485 A1 10/2004 Loose et al.
2004/0207154 A1 10/2004 Okada
2004/0209666 A1 10/2004 Tashiro et al.
2004/0209667 A1 10/2004 Emori et al.
2004/0209668 A1 10/2004 Okada
2004/0209670 A1 10/2004 Adachi et al.
2004/0209671 A1 10/2004 Okada

(56) References Cited

U.S. PATENT DOCUMENTS

| | | | |
|---|---|---|---|
| 2004/0209672 | A1 | 10/2004 | Okada |
| 2004/0209678 | A1 | 10/2004 | Okada |
| 2004/0209681 | A1 | 10/2004 | Emori et al. |
| 2004/0209682 | A1 | 10/2004 | Okada |
| 2004/0214635 | A1 | 10/2004 | Okada |
| 2004/0214637 | A1 | 10/2004 | Nonaka |
| 2004/0219965 | A1 | 11/2004 | Okada |
| 2004/0224747 | A1 | 11/2004 | Okada |
| 2004/0224758 | A1 | 11/2004 | Okada et al. |
| 2004/0227286 | A1 | 11/2004 | Tanimura et al. |
| 2004/0227866 | A1 | 11/2004 | Okada |
| 2004/0229680 | A1 | 11/2004 | Hoshino et al. |
| 2004/0229686 | A1 | 11/2004 | Tanimura et al. |
| 2004/0266510 | A1 | 12/2004 | Kojima |
| 2004/0266515 | A1 | 12/2004 | Gauselmann |
| 2004/0266521 | A1 | 12/2004 | Kojima |
| 2005/0032571 | A1 | 2/2005 | Asonuma |
| 2005/0037843 | A1 | 2/2005 | Wells et al. |
| 2005/0140088 | A1 | 6/2005 | Randall |
| 2005/0153775 | A1 | 7/2005 | Griswold et al. |
| 2005/0153780 | A1 | 7/2005 | Gauselmann |
| 2005/0187003 | A1 | 8/2005 | Adachi et al. |
| 2005/0192090 | A1 | 9/2005 | Muir et al. |
| 2005/0233799 | A1 | 10/2005 | Lemay et al. |
| 2005/0255908 | A1 | 11/2005 | Wells |
| 2005/0272500 | A1 | 12/2005 | Tanimura et al. |
| 2005/0282616 | A1 | 12/2005 | Tanimura et al. |
| 2005/0282617 | A1 | 12/2005 | Sekiguchi et al. |
| 2006/0014580 | A1 | 1/2006 | Hawthorn |
| 2006/0058100 | A1 | 3/2006 | Pacey et al. |
| 2006/0100013 | A1 | 5/2006 | Enzminger et al. |
| 2006/0135248 | A1 | 6/2006 | Anderson et al. |
| 2006/0199638 | A1 | 9/2006 | Walker et al. |
| 2006/0247041 | A1 | 11/2006 | Walker et al. |
| 2006/0252496 | A1 | 11/2006 | Rasmussen |
| 2006/0281530 | A1 | 12/2006 | Seelig et al. |
| 2007/0004513 | A1* | 1/2007 | Wells et al. ..................... 463/31 |
| 2007/0010318 | A1 | 1/2007 | Rigsby et al. |
| 2007/0019181 | A1 | 1/2007 | Sinclair et al. |
| 2007/0054730 | A1 | 3/2007 | Mattice et al. |
| 2007/0077986 | A1 | 4/2007 | Loose et al. |
| 2007/0149281 | A1 | 6/2007 | Gadda et al. |
| 2007/0228651 | A1 | 10/2007 | Loose et al. |
| 2008/0004104 | A1 | 1/2008 | Durham et al. |
| 2008/0039199 | A1 | 2/2008 | Baer et al. |
| 2008/0108422 | A1 | 5/2008 | Hedrick et al. |
| 2008/0113745 | A1 | 5/2008 | Williams et al. |
| 2008/0113746 | A1 | 5/2008 | Williams et al. |
| 2008/0113747 | A1 | 5/2008 | Williams et al. |
| 2008/0113748 | A1 | 5/2008 | Williams et al. |
| 2008/0113749 | A1 | 5/2008 | Williams et al. |
| 2009/0075721 | A1 | 3/2009 | Pacey et al. |
| 2009/0181755 | A1 | 7/2009 | Gagner et al. |
| 2009/0280888 | A1 | 11/2009 | Durham et al. |
| 2009/0312095 | A1 | 12/2009 | Durham et al. |
| 2010/0197378 | A1 | 8/2010 | Thomas |

FOREIGN PATENT DOCUMENTS

| | | | | |
|---|---|---|---|---|
| EP | 0 989 531 | A2 | 3/2000 | G07F 17/32 |
| GB | 2 124 505 | A | 2/1984 | A63D 13/00 |
| GB | 2 253 299 | A | 9/1992 | G07F 17/34 |
| GB | 2 349 494 | A | 11/2000 | G07F 17/32 |
| JP | 61-279272 | | 12/1986 | A63F 7/02 |
| JP | 02-019182 | | 1/1990 | A63F 7/02 |
| JP | 04-109977 | | 4/1992 | A63F 5/04 |
| JP | H04-114676 | | 4/1992 | A63F 5/04 |
| JP | H04-341288 | | 11/1992 | A63F 7/02 |
| JP | 05-177043 | | 7/1993 | A63F 7/02 |
| JP | 06-039085 | | 2/1994 | A63F 5/04 |
| JP | 07-16340 | | 1/1995 | A63F 7/02 |
| JP | 60-061079 | | 4/1995 | B05D 1/28 |
| JP | 07-124290 | | 5/1995 | A63F 5/04 |
| JP | 07-299189 | A | 11/1995 | A63F 7/02 |
| JP | 08-103541 | | 4/1996 | A63F 7/02 |
| JP | 25-31253 | | 1/1997 | A47F 11/06 |
| JP | 09-207625 | | 8/1997 | B60K 35/00 |
| JP | 10-071228 | | 3/1998 | A63F 5/04 |
| JP | 10-091076 | | 4/1998 | G09F 9/00 |
| JP | 10-305130 | | 11/1998 | A63F 5/04 |
| JP | 10-328398 | | 11/1998 | G07F 9/10 |
| JP | 11-090017 | | 4/1999 | A63F 7/02 |
| JP | 11-099240 | | 4/1999 | A63F 5/04 |
| JP | 11-137774 | | 5/1999 | A63F 5/04 |
| JP | 11-152970 | | 6/1999 | E06B 9/02 |
| JP | 11-153970 | | 6/1999 | G09F 9/33 |
| JP | 11-244451 | | 9/1999 | G63F 5/04 |
| JP | 2000-51314 | | 2/2000 | A63F 5/04 |
| JP | 2000-65097 | | 3/2000 | A63F 5/04 |
| JP | 2000-68925 | | 3/2000 | A63F 5/04 |
| JP | 2000-262738 | | 9/2000 | A63F 13/00 |
| JP | 2002-113150 | | 4/2002 | A63F 5/04 |
| JP | 2002-279964 | | 9/2002 | H01M 2/26 |
| WO | WO 99/53454 | A1 | 10/1999 | G07F 17/34 |
| WO | WO 99/64997 | A1 | 12/1999 | G07F 17/34 |
| WO | WO 00/32286 | A1 | 6/2000 | A63F 9/22 |
| WO | WO 01/34262 | | 5/2001 | A63F 13/08 |
| WO | WO 03/089080 | | 10/2003 | |
| WO | WO 2006/036948 | A2 | 4/2006 | A63F 9/24 |
| WO | WO 2006/039371 | A2 | 4/2006 | A63F 9/24 |
| WO | WO 2006/124976 | A1 | 11/2006 | A63F 13/00 |
| WO | WO 2007/005846 | A2 | 1/2007 | A61N 1/05 |
| WO | WO 2007/011717 | A2 | 1/2007 | G06F 19/00 |
| WO | WO 2007/030781 | | 3/2007 | A63F 13/00 |
| WO | WO 2007/030781 | A2 | 3/2007 | A63F 9/24 |
| WO | WO 2007/030781 | A3 | 3/2007 | A63F 13/00 |

OTHER PUBLICATIONS

"Bigfoot" Product Sheet, Shuffle Master, Inc., 1 page (2000).
"Cabby Cash™" Product Sheet, Anchor Gaming, 2 pages (2000).
"Congo Quest™" Product Sheet, Anchor Gaming, 2 Pages (2000).
"Fishin' Buddies™" Product Sheet, Anchor Gaming, 2 pages (2000).
"Goooaal!" Product Sheet, Bally Gaming, Inc., 2 pages (2000).
"Great Whites" Product Sheet, VLC, Inc., 2 pages (2000).
"Jackpot Stampede Deluxe™" Product Sheet, WMS Gaming Inc., 2 pages (1997).
"Light-emitting diode", (http://en.wikipedi.org/wiki/Light-emitting_diode), 13 pp. (Oct. 14, 2006).
"Liquid Crystal Display", (http://en.wikipedia.org/wiki/Liquid_crystal_display), 8 pp. (Oct. 14, 2006).
"Loaded Dice" Product Sheet, Konami Gaming, 2 pages (2000).
"Neptune's Pearls" Product Sheet, Unidesa Gaming, 4 pages (1998).
"Optics", (http://en.wikipedia.org/wiki/Optics), 5 pp. (Oct. 14, 2006).
"Penguin Pays" Product Sheet, Aristocrat Incorporated, 2 pages (1998).
"Prism (optics)", (http://en.wikipedia.org/wiki/Prism_%28optics%29), 2 pages (Oct. 14, 2006).
"Rear-Projection HDTV Microdisplays Fire Back" Technology Report of May 11, 2006, (http://www.electronicdesign.com/Articles/Print.cfm?AD=1&ArticleID=12441), 9 pages (Oct. 14, 2006).
"Stroke of Luck™" Product Sheet, WMS Gaming Inc., 2 pages (1997).
"The Microdisplay Page . . . your guide to microdisplay development around the world", (http://tfcg.elis.ugent.be/microdis), 10 pages (Oct. 14, 2006).
"The Other Microdisplay" Technology Report of May 11, 2006, (http://www.electrorticdesign.com/Articles/Print.cfm?AD=1&ArticleID=12440), 3 pages (Oct. 14, 2006).
"Wild Cougar" Article, Strictly Slots, p. 44 (Feb. 1999).
"Yahtzee® Brand Video Game" Product Brochure, Hasbro, Inc., 2 pages (2000).
Article for "Flip Flop", Strictly Slots, p. 48 (Jun. 2000).
Article for "The Pink Panther", *Strictly Slots*, p. 50 (Feb. 2001).
Article, "Microdisplays Move Outside the Box", Spie's OE Magazine, 3 pages (Nov. 2002).

(56) References Cited

OTHER PUBLICATIONS

Brochure for "3RV", WMS Gaming Inc., Waukegan, IL, 2 pages (undated).
European Search Report and Search opinion from corresponding European patent application No. 10172635.4, 6 pages (dated Oct. 27, 2010).
Extended European Search Report, Application No. 07810069.0 (PCT/US2007/015186), 6 pages (dated Nov. 19, 2010).
International Search Report—PCT/US07/15171, 2 pages (dated Oct. 3, 2008).
International Search Report—PCT/US07/15185, 2 pages (dated Sep. 25, 2008).
International Search Report—PCT/US07/15186, 2 pages (dated Oct. 3, 2008).
Legato, Frank, "The Full Monty," Strictly Slots, pp. 48-50 (Jun. 1999).
Silicon Gaming, Odyssey Operation and Service Guide, Table of Contents and Introduction, Publication No. 820-0002-02, Rev. B, downloaded on May 20, 2014 from http://www.robertwinter.com/slot/odyssey/ docs/00_TOC_Intro.pdf, 36 pages (estimated publication date of Oct. 1998).
Silicon Gaming, Odyssey Operation and Service Guide, "Chapter 1: Functional Overview", Publication No. 820-0002-02, Rev. B, downloaded on May 20, 2014 from http://www.robertwinter.com/slot/odyssey/docs/ 01_Functional_Overview.pdf, 20 pages (estimated publication date of Oct. 1998).

* cited by examiner

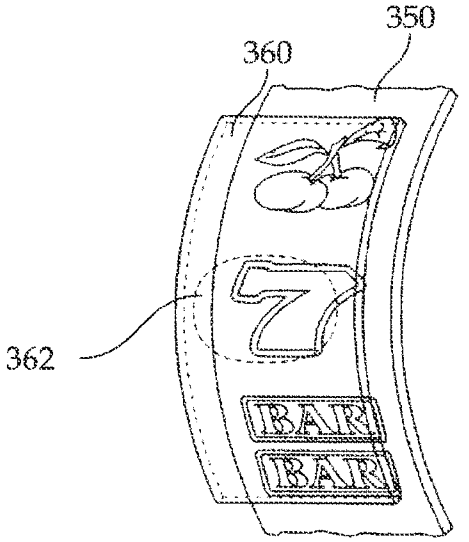
*Fig.14*
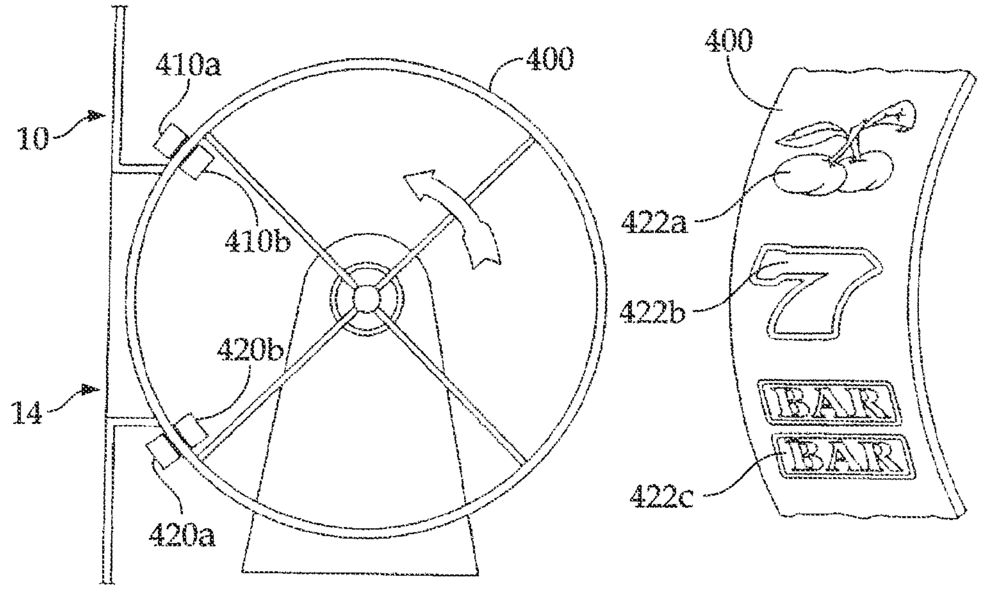
*Fig.15A*
*Fig.15B*

WAGERING GAME WITH SIMULATED MECHANICAL REELS

CROSS-REFERENCE TO RELATED APPLICATIONS

This application is a continuation of U.S. patent application Ser. No. 11/937,740, filed on Nov. 9, 2007, which is a continuation-in-part of U.S. patent application Ser. No. 11/847,560, filed on Aug. 30, 2007, which is a continuation-in-part of International Application No. PCT/US2007/15185, filed on Jun. 29, 2007, which claims the benefits of U.S. Patent Application No. 60/818,127, filed Jun. 30, 2006, and U.S. Patent Application No. 60/876,917, filed Dec. 22, 2006, and furthermore, U.S. patent application Ser. No. 11/937,740, filed on Nov. 9, 2007, claims the benefit of U.S. Patent Application No. 60/959,130, filed on Jul. 11, 2007. The aforementioned '740, '560, '185, '127, '917 and '130 applications are incorporated herein by reference in their entireties.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines and methods for playing wagering games, and more particularly, to a gaming machine having video displays that provide images that more accurately simulate mechanical-type spinning reels and gaming machines with improved mechanical reels.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

Video-based slot machines allow for flexibility in game design and do not require any additional hardware for implementing different games, such as bonus games. With respect to flexibility in game design, the video display of a video-based slot machine can depict complex and entertaining graphical images, animations, and play sequences that cannot be employed in mechanical slot machines. Video-based slot machines do not require any additional hardware for implementing bonus games because the bonus game may be depicted on the primary video display and executed by the same game controller used to execute the video slot game.

Video-based slot machines and mechanical slot machines generally appeal to different segments of the market. Although many players are attracted to the complex and entertaining graphical images, animations, and play sequences afforded by video-based slot machines, many players are still drawn to mechanical slot machines because they are simplistic machines that often only pay on a single pay line and only require a pull of a handle to initiate a spin of the reels. Part of the reason that these players avoid video-based slot machines is that the simulated reels on the video-based machines are different in looks than standard mechanical reels. This is primarily due to the nature of the video screen displaying the images.

It would be beneficial to incorporate some of the features of the video-based slot machines into a traditional mechanical slot machine because of the flexibility that these video-based machines offer. A need exists for a slot machine having video-based capabilities, while still preserving the simplistic rotation of mechanical reels that traditionalists appreciate in the traditional mechanical slot machine.

SUMMARY OF THE INVENTION

The present invention is a gaming machine that includes a housing having a display region, a transparent layer, and a video display. The transparent layer is located in the display region and has a radius of curvature. The video display is located behind the transparent layer for projecting moving images onto the transparent layer. The images include a plurality of symbols that indicate a randomly selected outcome of the wagering game. The curved transparent layer can also be moving as well.

The present invention also contemplates a method of operating a gaming machine comprising receiving a wager to play a wagering game and moving a plurality of symbols across a curved transparent layer by projecting images onto the curved transparent layer from a video display. The plurality of symbols indicates a randomly selected outcome of the wagering game. The curved transparent layer can be moving as well.

In another embodiment, a gaming machine for playing a wagering game includes a housing having a display region, a controller for conducting the wagering game and a video display coupled to the controller. The video display simulates mechanical reels of a slot machine in the display region. The video display further displays images of a plurality of symbols that indicate a randomly selected outcome of the wagering game. The images include at least one imperfection associated with a mechanical reel.

In another embodiment, a gaming machine for playing a wagering game includes a housing having a display region, a controller for conducting the wagering game and a video display coupled to the controller. The video display simulates mechanical reels of a slot machine in the display region and displays images of a plurality of symbols that indicate a randomly selected outcome of the wagering game. The images include at least one imperfection associated with a mechanical reel and the images can be rendered with a real-time 3-D engine.

The present invention can also be considered a gaming machine that includes a housing having a display region, a video display, a controller for conducting the wagering game, and at least one sensor coupled to the controller. The sensor provides locational information concerning a location of the player relative to the display region. The video display is coupled to the controller and displays images that simulate mechanical reels of a slot machine in the display region. The images include a plurality of symbols that indicate a randomly selected outcome of the wagering game. The images undergo alterations in response to the locational information.

In another embodiment, a method of operating a gaming machine includes receiving a wager to play a wagering game and sensing a location of a player at the gaming machine. The method further includes displaying video images of symbols across a display region of the gaming machine, and in response to a change in the location, altering the video images of the symbols.

In a further embodiment of the present invention, a method of operating a gaming machine includes receiving a wager to play a wagering game and sensing the environment around the gaming machine. The method further includes displaying video images of symbols across a display region of the gaming machine, and in response to a change in the environment, altering the video images of the symbols.

The present invention can also be considered a gaming machine for playing a wagering game that includes a housing having a display region, a controller for conducting the wagering game, and a video projector coupled to the controller for simulating mechanical reels of a slot machine in the display region. The display region includes a plurality of projection surfaces secured to floating screen assemblies. The video projector projects images of a plurality of symbols that indicate a randomly selected outcome of the wagering game. The images are projected onto the projection surfaces within the display region.

In another embodiment, a gaming system for playing a slots game includes a controller for conducting the slots game, a display area having a plurality of floating screen assemblies that include projection surfaces, and a video projector coupled to the controller. The video projector projects an image onto the projection surfaces. The image contains a plurality of symbols. The plurality of symbols indicates a randomly selected outcome of the slots game. The plurality of symbols in the projected image move to simulate mechanical reels of the slots game.

In a further embodiment of the present invention, a method of conducting a slots game includes conducting the slots game at a gaming terminal having a plurality of floating screen assemblies. The method further includes projecting images of a plurality of symbols onto display surfaces of the floating screen assemblies. The plurality of symbols indicates a randomly selected outcome of the slots game.

In another embodiment, a gaming terminal for playing a wagering game includes a housing having a display region. A first image display device for simulating mechanical reels of a slot machine in the display region includes a curved surface that approximates the radius of curvature of a mechanical reel. The curved surface displays first video images that include a plurality of symbols indicating a randomly selected outcome of the wagering game. A second image display device displays second video images spatially separated from and overlaying the first video images within the display region. The second video images include indicia related to the wagering game.

In another embodiment, a gaming machine for playing a slots game includes a housing having a display region. A curved surface portrays a first set of moving video images including a plurality of symbols that indicate a randomly selected outcome of the wagering game. The curved surface and the first set of moving video images simulate a mechanical reel within the display region. A second surface is located within the display region and in front of the curved surface. The second surface displays a second set of video images including indicia related to the wagering game.

In a further embodiment, a method of operating a wagering game having simulated mechanical reels includes receiving a wager to play the wagering game. A first set of video images is displayed on a first display surface having a curved shape. The first set of video images simulates the movement of symbols on a mechanical reel. A second set of video images is displayed on a plane that is spatially separated from and overlaying the first display surface.

The above summary of the present invention is not intended to represent each embodiment or every aspect of the present invention. The detailed description and Figures will describe many of the embodiments and aspects of the present invention.

BRIEF DESCRIPTION OF THE DRAWINGS

The foregoing and other advantages of the invention will become apparent upon reading the following detailed description and upon reference to the drawings.

FIG. 14 is a perspective view of an OLED display device overlaying a standard mechanical reel strip in accordance with another embodiment of the present invention;

FIGS. 15A and 15B are a side view and a perspective view, respectively, of the display region of the gaming machine in accordance with a further embodiment of the present invention;

DESCRIPTION OF ILLUSTRATIVE EMBODIMENTS

Figure 1A:
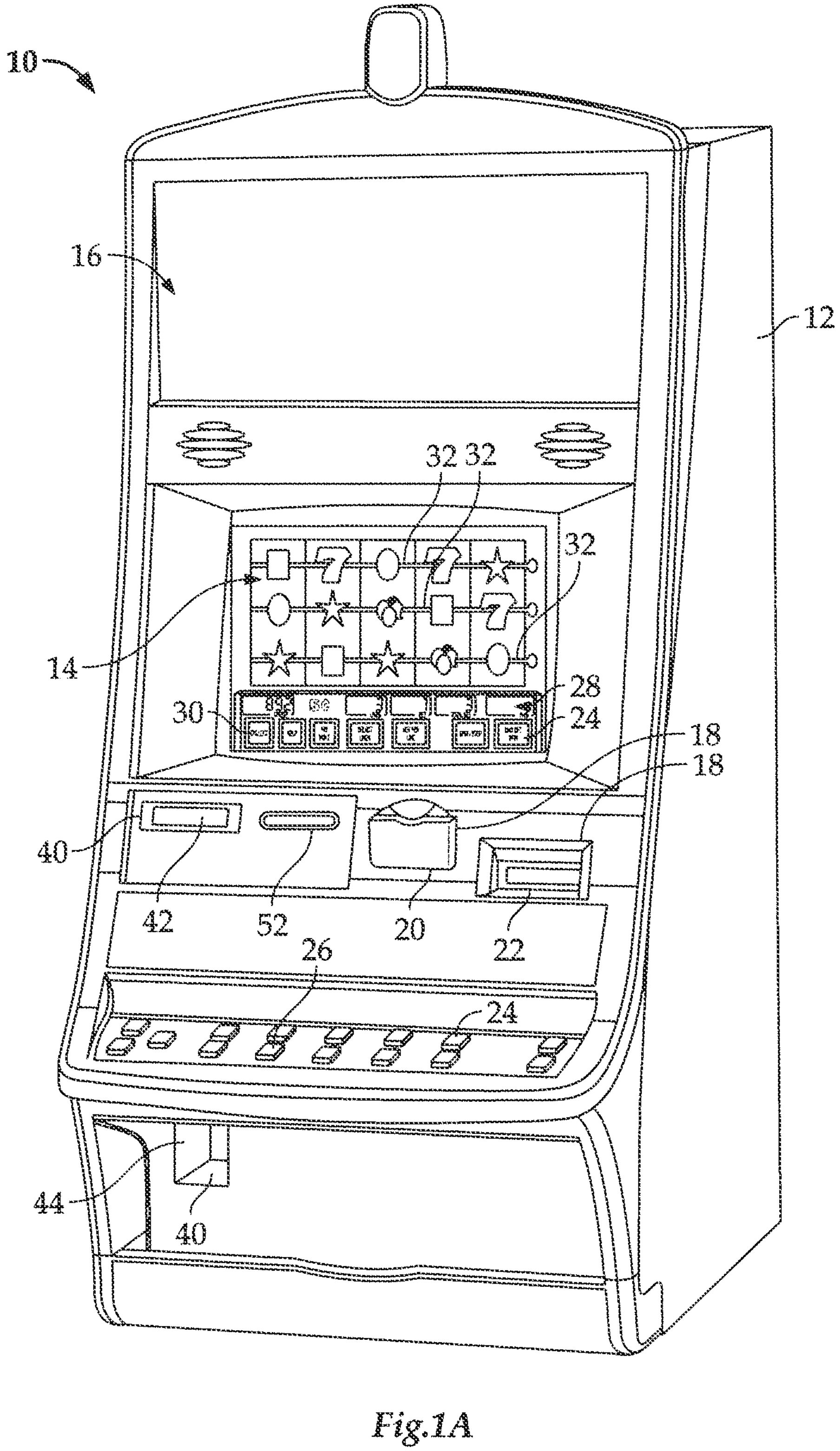
FIG. 1A is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game. In some embodiments, other player input devices 24 such as a pull arm or joystick, which a player may push or pull or move left and right, are used to provide other input interfaces to operate the gaming machine 10.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
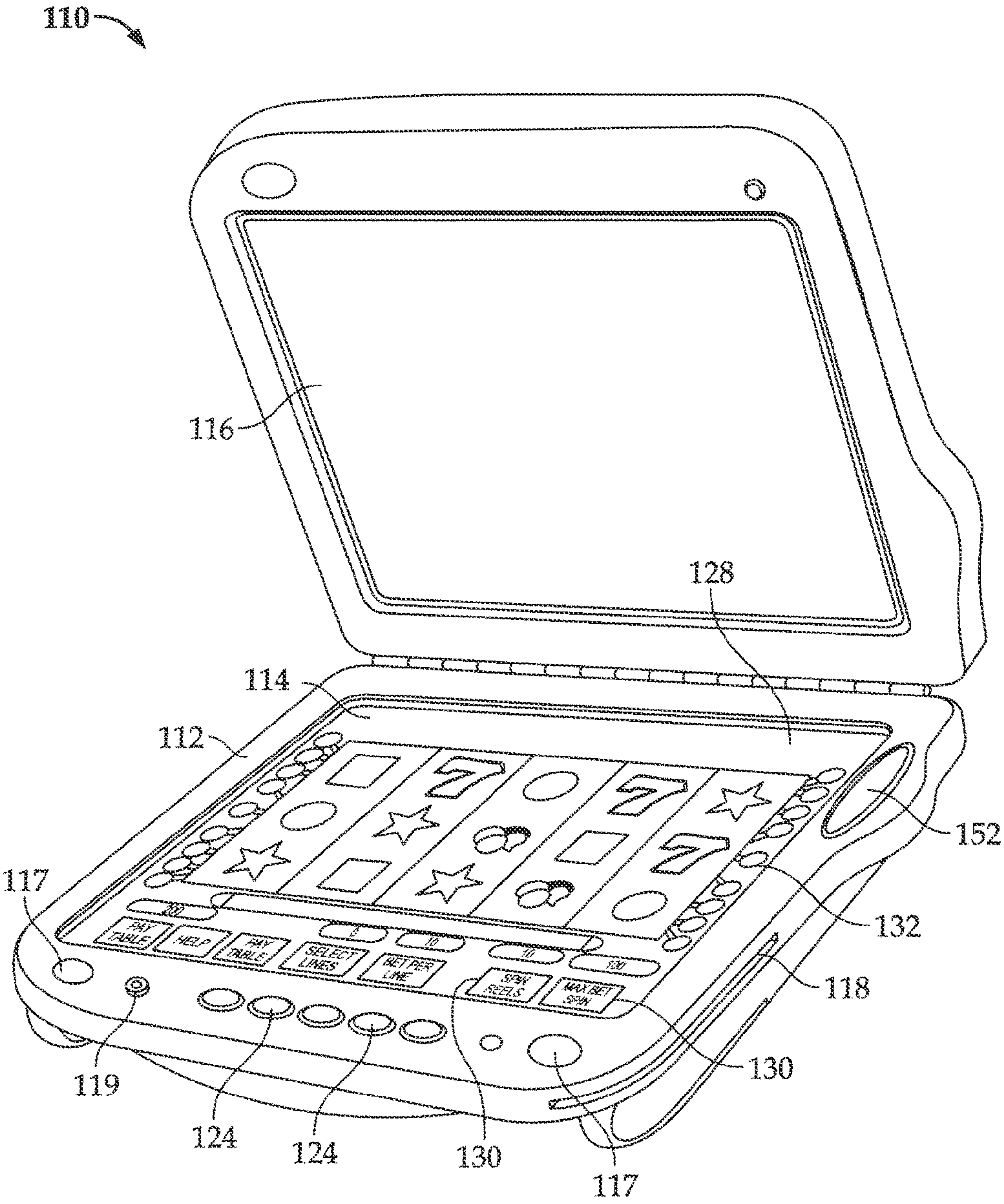
FIG. 1B is a perspective view of a handheld gaming machine embodying the present invention.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, blackjack, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
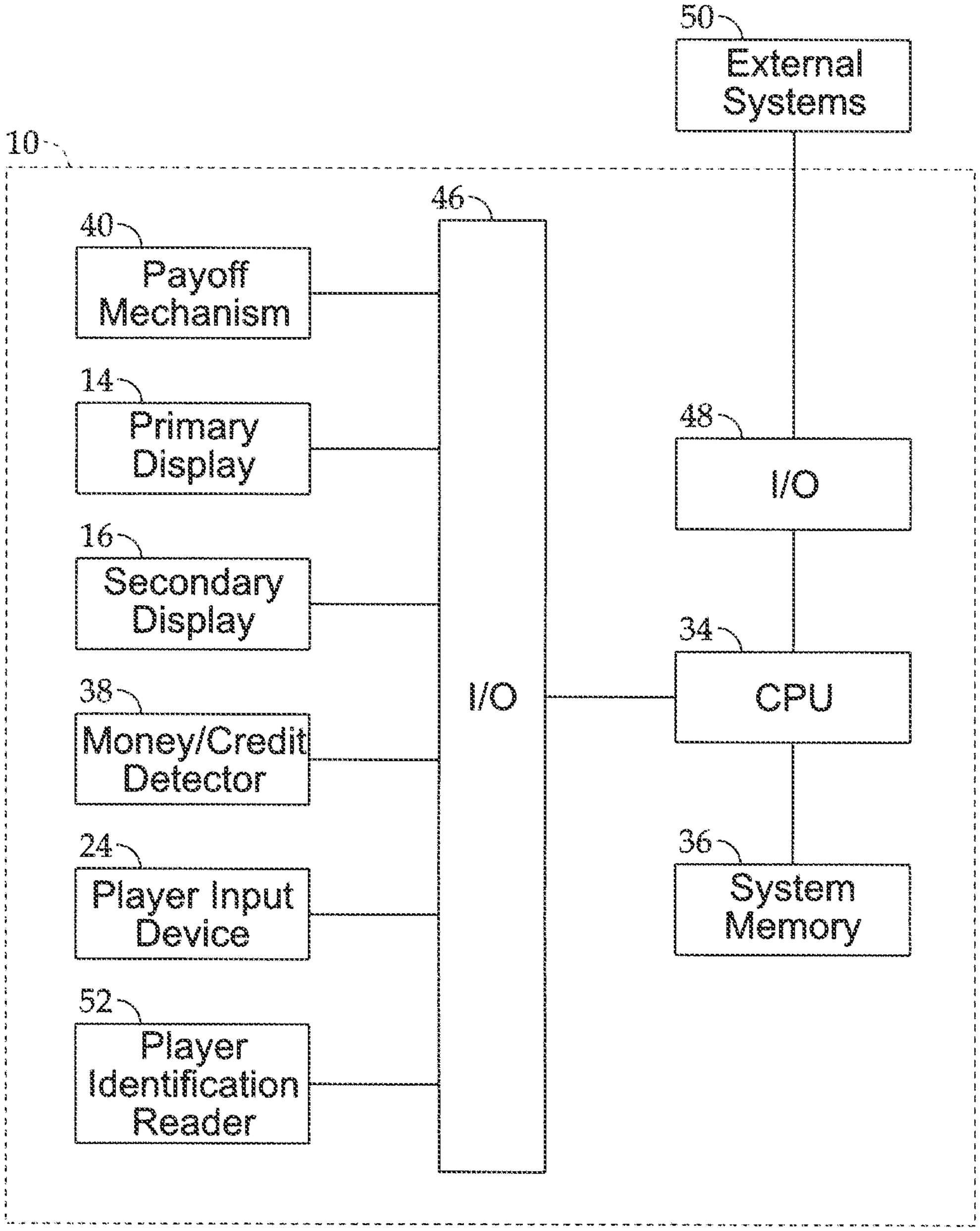
FIG. 2 is a block diagram of a control system suitable for operating the gaming machines of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality therebetween (e.g., a "rich client"). As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "rich client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal digital assistant (PDA), a counter top or bar top gaming machine, or other personal electronic device such as a portable television, MP3 player, entertainment device, etc.

Figure 3:
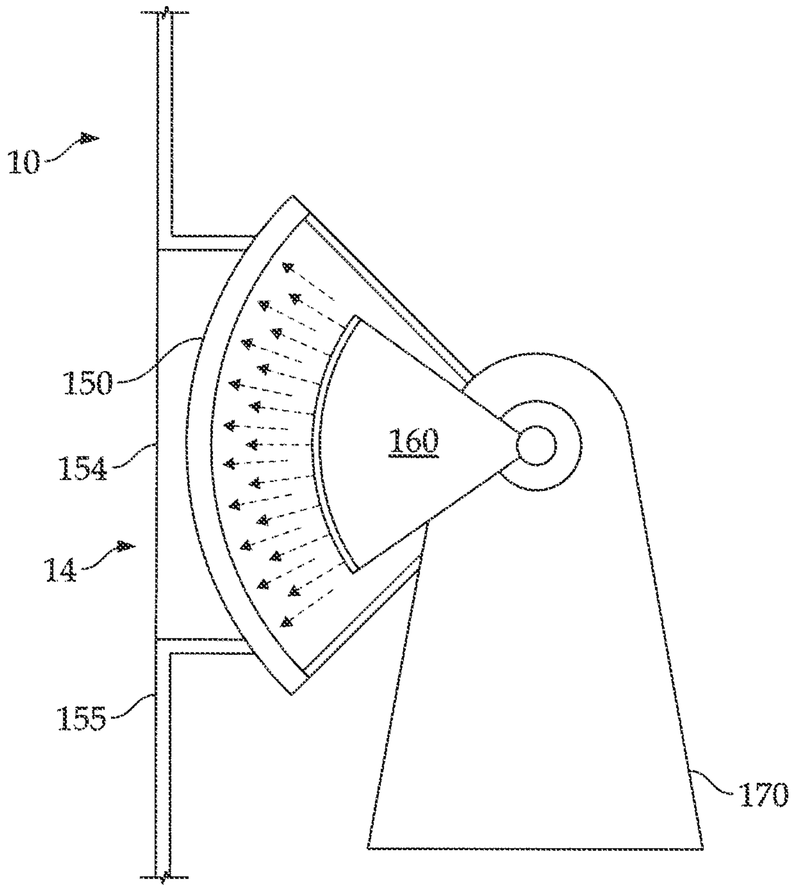
FIG. 3 is a side view of the display region of the gaming machine in accordance with one embodiment of the invention.

FIG. 3 illustrates one embodiment used for the primary display 14 of gaming machine 10. A transparent layer 150 is located within an outer window 154, which is attached to the housing 155 of the gaming machine 10. The transparent layer 150 has a radius of curvature that is similar to the radius of curvature of a mechanical reel used within a mechanical-reel style of gaming machine 10 (e.g., four inches to seven inches). Although it is referred to as the "transparent" layer 150, the transparent layer 150 can be semi-transparent or semi-transparent for only certain wavelengths of light, such as various polymeric materials.

In certain embodiments, a video display device 160 is a projection device that transmits and projects images onto the transparent layer 150. For example, the video display device 160 can be an LCD projection device or a DLP projection device that creates images on the transparent layer 150. Other examples of a video display device 160 can include traditional projection technologies or other systems, such as liquid crystal on silicon (LCoS) technology, heads-up display (HUD), light pipe displays, fiber optic displays and laser projection displays (e.g., a three-colored laser). The images produced by the video display device 160 are dynamic images that move in a manner that is similar to the movement of symbols on a mechanical reel. Accordingly, the images include a plurality of symbols used for indicating the randomly selected outcome of the wagering game. From the player's perspective, these images appear to be symbols rotating on a mechanical reel having a radius of curvature equivalent to the radius of curvature of the transparent layer 150. In certain embodiments, the images can be a high-resolution output, such as an 800×600 pixel display, or greater, or other suitable resolution that would be considered high-resolution to those familiar with the field of disclosure.

The video display device 160 and transparent layer 150 can be mounted to one common structure 170 located within the housing 155. Alternatively, the transparent layer 150 can be mounted directly to the housing 155 (like the window 154) because the transparent layer 150 does not rotate or move whatsoever. In certain embodiments, the video display device 160 can project images onto the inside surface of the transparent layer 150 (that is, rear projection) as illustrated for example in FIG. 3. In other embodiments, the video display device 160 can project images on an outside surface of the transparent layer 150 (that is, front projection). In the example of front projection, the video display device 160 can be located in the area between adjacent reels or simulated reels or from the area above or below the reels. In either a front or rear projection system, the video display device is out of the line-of-sight of a player of the gaming machine.

In the embodiment of FIG. 3, and the other embodiments discussed below, the window 154 is of the type that is used in typical mechanical slot machines. The window 154 may have artwork with a theme that matches the game. Miniature display meters can be mounted to the window 154 to provide information (e.g., total credits, credits being wagered, etc.) to the player.

Further, while the embodiment of FIG. 3 is shown with respect to a single reel, it can be replicated several times on adjacent reels (e.g., three or five times to produce three or five simulated mechanical reels). As such, the gaming machine 10 would appear as a three-reel slot machine or a five-reel slot machine. Alternatively, the video display device 160 can have a size that allows it to provide images for more than one (or all) of the simulated mechanical reels. In certain embodiments, strobe projection using a single video display device 160 is used. The video display device 160 sequentially outputs multiple image signals onto respective multiple transparent layers 150 using frequency cycles greater than can be perceived by the human eye. In other examples, images can be projected from the side of a series of reels using sequential mirrors within the reels to split the signal projected from the video display device 160.

In certain embodiments, such as illustrated in FIGS. 3-8, the projection distance from the video display device to the transparent layer can vary based on a number of factors including focal length, mechanical limitations, spatial limitations, lensing abilities and other factors that depend on the type of video display device, the type of transparent surface and the type of reel being used. In certain embodiments, the projection distance varies from one inch to several inches.

Figure 4A:
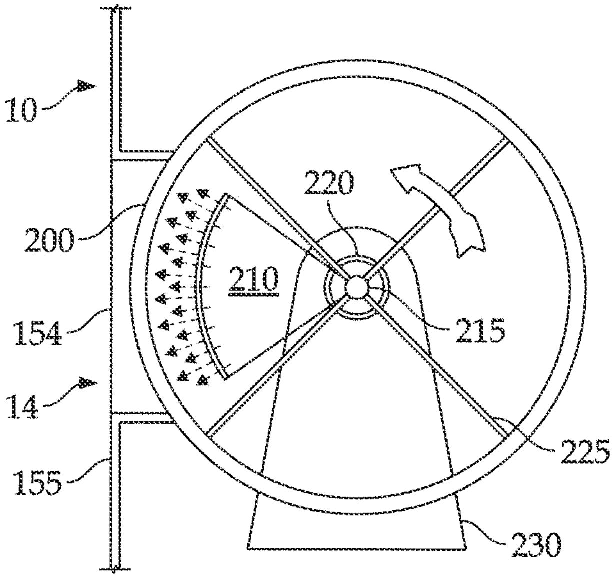
FIGS. 4A and 4B are a side view and a perspective view, respectively, of the display region of the gaming machine in accordance with another embodiment of the invention.
Figure 4B:
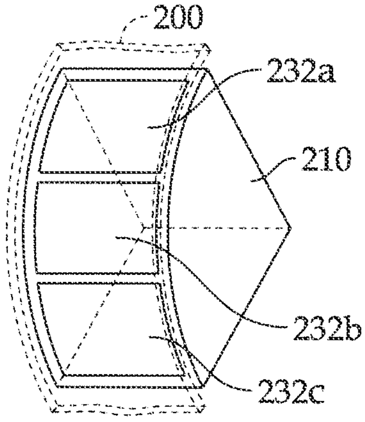

FIGS. 4A and 4B illustrate an alternative embodiment in which the primary display 14 includes a transparent layer 200 that moves within the housing 155 adjacent to the window 154. The radius of curvature of the transparent layer 200 is similar to the radius of curvature of a mechanical reel within a typical slot machine. The video display device 210 is located within a transparent layer 200 and projects moving images onto the moving transparent layer 200. In one embodiment, the velocity of the moving images produced by the video display device 210 generally corresponds to the velocity of the movement of the transparent layer 200. Thus, the image projected onto the transparent layer 200 is synchronized with the movement of the transparent layer 200. In this situation, the gaming machine 10 would typically include a device coupled to the drum or cage rotating the transparent layer, such as an encoder, that can be used to measure the angular position and, thus, the angular velocity of the transparent layer 200 so that the movement of the images can accelerate and decelerate as needed. In another embodiment, synchronization is not used and the transparent layer 200 moves at a different velocity as the images.

The transparent layer 200 is mounted in a fashion that is similar to a mechanical reel in that it includes a central axis 215 and support struts 225 leading from the central axis 215 to the transparent layer 200 or a drum supporting the transparent layer 200. The central axis 215 is located on a mounting structure 230 within the housing 155 of the gaming machine 10.

Although the video display device 210 can be mounted on a separate structure within the housing 155, the video display device 210 is mounted onto a portion 220 of the same mounting structure 230 in the illustrated embodiment of FIG. 4. Accordingly, as the transparent layer 200 rotates around the central axis 215, any vibrations or off-axis movements may cause the video display device 210 to produce slight imperfections in the images (i.e., "jitter" of the images), which is similar to the imperfect motion achieved by traditional mechanical reels. This "jitter" of the images of the video display device 210 can be advantageous, as is described below with respect to FIG. 21. Alternatively, if no "jitter" is desired, the transparent layer 200 and the video display device 210 can both be mounted on the mounting structure 230 in a manner that includes a vibration-reduction mechanism to minimize or remove the inherent vibrations that may be experienced by the video display device 210.

FIG. 4B illustrates the video display device 210 and the transparent layer 200 (dashed lines) from the front of the gaming machine 10. The video display device 210 projects images onto the transparent layer 200 such that there are three distinct symbol locations 232*a*, 232*b*, 232*c*. Accordingly, subsequent to the spinning motion associated with the images from the video display device 210, the images come to a stop such that they are static images of symbols used for indicating the randomly selected outcome, as shown by the symbols in the primary display 14 of FIG. 1. While FIGS. 4A and 4B have been described as having one display device 210 to create one simulated mechanical reel, one long display device 210 can be used to create the images on a plurality of rotating transparent layers 200, creating a plurality of simulated mechanical reels.

In a further alternative, the display device 210 includes a plurality of the display devices located entirely around the central axis 215 such that images can be produced around the entire circumference of the transparent layer 200. The display devices rotate with the transparent layer 200 such that each display device inherently controls the images along a fixed portion of the circumference of the transparent layer 200.

FIGS. 5A-5D illustrate several alternative embodiments for locating a video display device 610 of a gaming machine 10 relative to a projection layer 700. The embodiments of FIGS. 5A-5D include a rotatable mechanical structure 640 that can spin about a central axis 615. The rotatable structure 640 can be secured to a mounting structure 630. In the illustrated embodiments, the primary display 614 includes a projection surface 700 mounted to the rotatable structure 640 that moves within a housing 655 adjacent to a window 654. The radius of curvature of the projection surface 700 is similar to the radius of curvature of a mechanical reel or other rotatable mechanical structure within a typical slot machine. The projection surface 700 can include, for example, a transparent layer, a semi-transparent layer, or a non-transparent layer. For rear-projection video displays, a transparent layer is typically used. For a front-projection video display, a non-transparent layer is typically used such as a textile-backed or non-textile-backed projection surface.

Figure 5A:
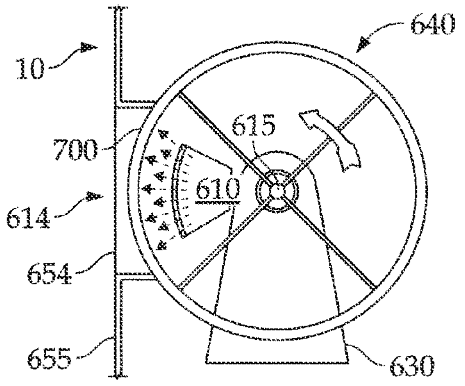
FIGS. 5A, 5B, 5C and 5D are side views of the display region of a gaming machine illustrating various projection systems in accordance with other embodiments of the invention.
Figure 5B:
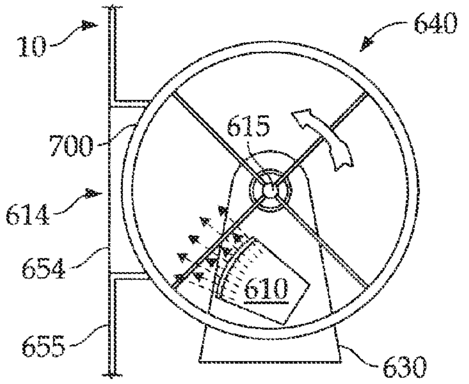
Figure 5C:
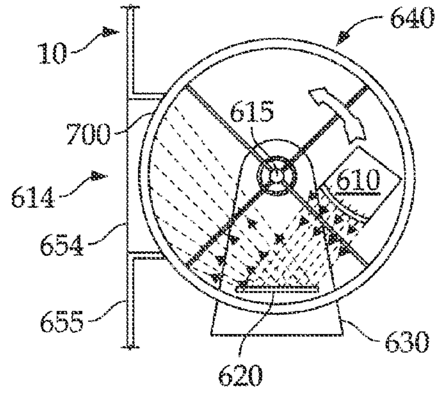

Video display device 610 can be mounted below or behind the central axis 615 and project images, either, directly onto the projection surface 700, or indirectly using mirrors, lenses, and/or light piping display technology. The video display device 610 in FIGS. 5A-5C is located within the projection surface 700 and is used to project moving images onto the projection surface 700. In the embodiment illustrated in FIG. 5A, the video display device 610 is mounted between the central axis 615 and the primary display 614 behind the projection surface 700. The video display device in FIG. 5A is mounted within the gaming machine 10 away from the central axis 615.

In the embodiment illustrated in FIG. 5B, the video display device 610 is mounted below the central axis 615 and projects an image onto the projection surface 700 at an upward angle toward primary display 614.

In the embodiment illustrated in FIG. 5C, the video display device 610 is located behind the central axis 615 away from the primary display 614. The video display device 610 can project an image at a downward angle (shown) or an upward angle (not shown) toward a mirror 620 which reflects the projected image onto the projection surface 700 in a direction toward the primary display 614.

Figure 5D:
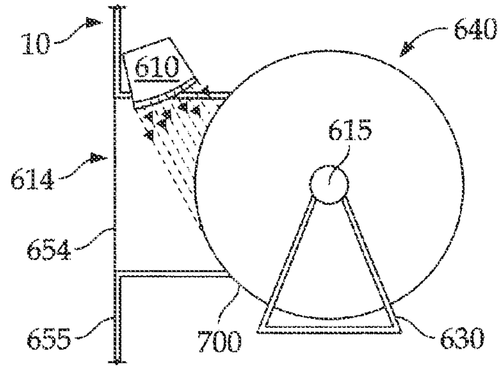

In the embodiment illustrated in FIG. 5D, the video display device 610 is located outside of the rotatable structure 640 and projects images within the primary display 614 at either a downward angle (shown) or an upward angle (not shown) onto the outside surface of projection surface 700. In the example shown, the projection surface is a curved reel strip for a mechanical reel typically used in a slots game. In certain embodiments, the video display device 610 can project images from either the left or the right of the projection surface 700.

Figure 6A:
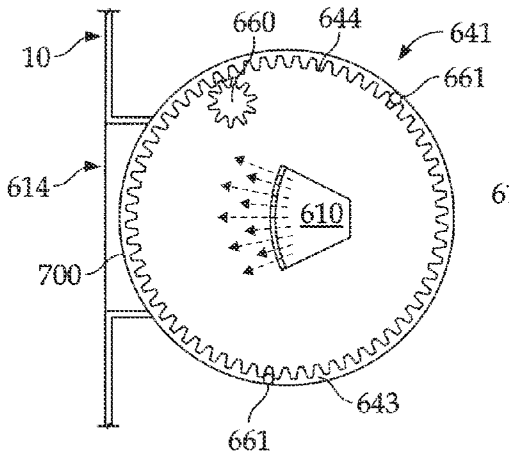
FIGS. 6A, 6B, 6C, 6D and 6E are side views of the display region of a gaming machine illustrating various support and drive systems in accordance with embodiments of the invention.

FIGS. 6A-6E illustrate examples of alternate support systems and drive systems for a projection surface 700. The use of alternate support and drive systems can increase the flexibility by which a video display device 610 is located within a gaming machine 10. In the embodiment illustrated in FIG. 6A, the projection surface 700 is supported at the periphery with a rotatable mechanical structure 641. FIG. 6A illustrates the use of a gear 660 to drive the mechanical structure 641 (e.g., mechanical reel) to which the projection surface 700 is mounted. The mechanical structure 641 can be driven, in certain embodiments, using an edge-driven direct-gear drive or a worm-gear drive. Additional gears can also be used to rotate the mechanical structure 641. Two rollers 661 can be used in certain embodiments to support the mechanical structure 641 at the periphery. The rollers 661 roll similar to a train wheel rotating along a smooth track 643, or in the case of the gear 660, a toothed track 644. The tracks 643, 644 in FIG. 6A are located on the inside of the rotatable structure 641.

Figure 6B:
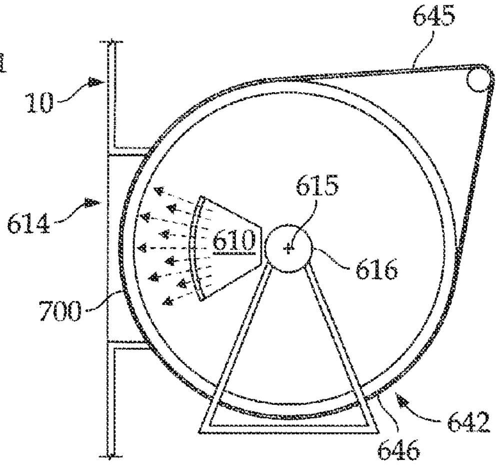

In the embodiment illustrated in FIG. 6B, the projection surface 700 is supported about a central axis 615 using a drive belt 645 to rotate a mechanical structure 642, which supports the projection surface 700. The drive belt 645 can engage the mechanical structure 642 on a track 646 along the outside circumference of the mechanical structure 642. In one alternative, the drive belt 645 can engage an axle 616 rotatable about the central axis 615.

Figure 6C:
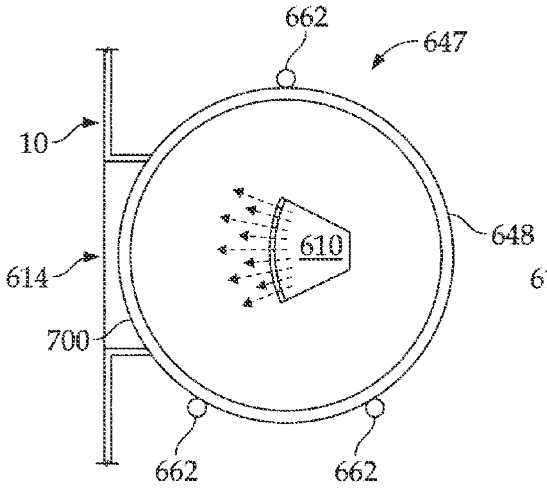
Figure 6D:
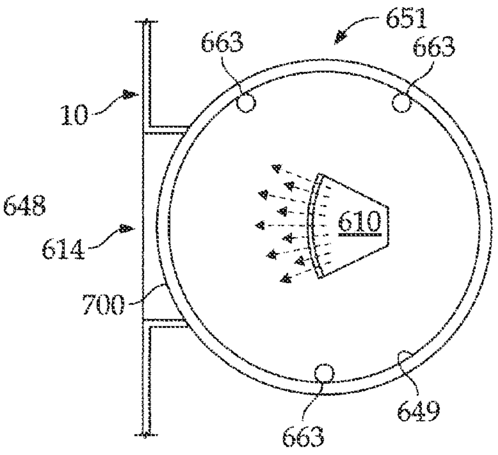

In the embodiments illustrated in FIGS. 6C-6D, the projection surface 700 is supported using a three-point support system based on three rollers 662, 663 rotatable about an outside track 648 (FIG. 6C) or an inside track 649 (FIG. 6D). Additional rollers can be used to support the projection surface 700. The projection surface 700 can also be mounted to a mechanical structure 647, 651. The rollers 662, 663 can operate along a smooth track similar to the rollers described for FIG. 6A. In certain embodiments, the rollers 662, 663 have sufficient frictional or other mechanical contact with the track 648, 649 to rotate the mechanical structure 647, 651.

Figure 6E:
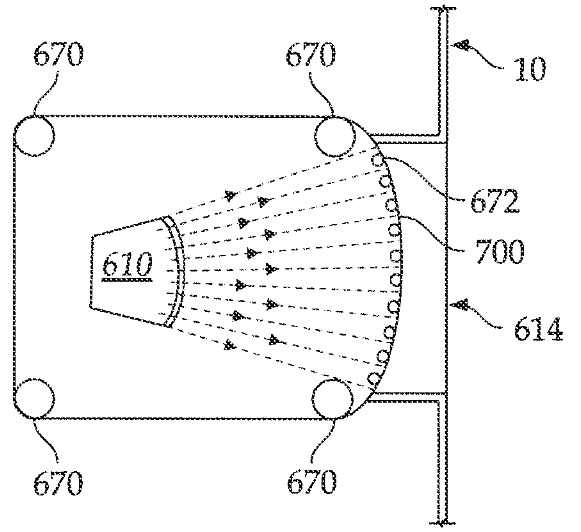

In the embodiment illustrated in FIG. 6E, the projection surface 700 is arranged to move continuously in a generally non-circular manner about a group of rollers 670. In the primary display 614 area, the projection surface 700 can move in an arc-shaped circular path to simulate or give the appearance to a player of a mechanical reel. The configuration of FIG. 6E allows additional alternatives to place the video display device 610. Additional rollers 672 can be used to support and shape the projection surface 700 to give it an arc-shaped circular path as is passed along the primary display 614.

Figure 7A:
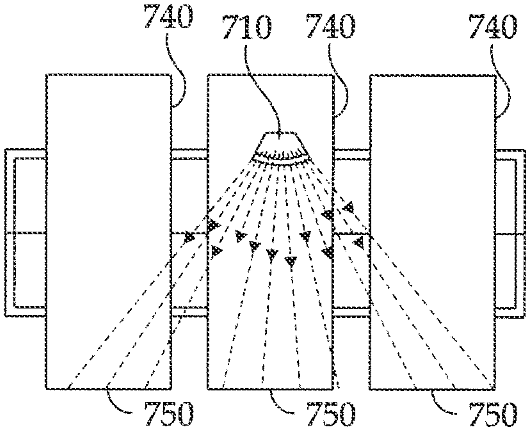
FIGS. 7A and 7B are top views of the display region of a gaming machine illustrating additional projection systems in accordance with embodiments of the invention.
Figure 7B:
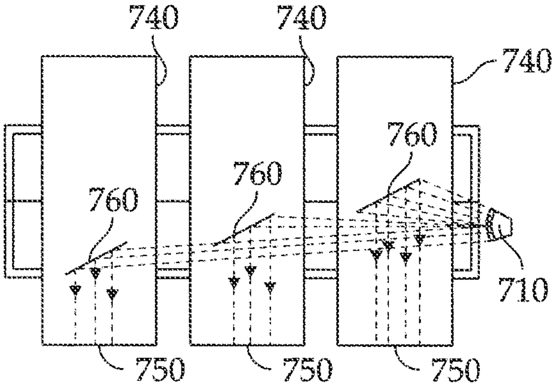

In FIGS. 7A-7B a top view is illustrated for the video display device 710 of a gaming machine in which, for example, a single video display device 710 is used to project onto multiple projection surfaces 750. In the embodiment illustrated in FIG. 7A, a single video display device 710 projects images onto three projection surfaces 750. The projection surfaces can be mounted to rotatable mechanical structures similar to the gaming machines illustrated in FIGS. 4-6. The location of the video display device 710 can also vary similar to the examples illustrated in FIGS. 4-6. A video display splitter or similar device within the video display device 710 can be used to allow a single video display device 710 to project separate images onto three separate projection surfaces 750. In certain embodiments, the single video display device 710 can have three separate projectors directed to the three projection surfaces 750 for displaying the projected images.

Alternatively, strobe projection can be used in which images are alternately or sequentially projected onto the respective three projection surfaces 750, one image at a time, but at frequency cycles greater than can be perceived by the human eye so that the impression of a human observer is that the images are being projected continuously onto all three projection surfaces 750. In the embodiment illustrated in FIG. 7B, a single video display device 710 projects images from the side (parallel to the axis of rotation) of the rotatable mechanical structures 740. The image is projected onto a mirror 760 located within the respective mechanical structure 740 which directs the image onto a projection surface 750. A video display splitter or other devices described for FIG. 7A or similar systems can be used to project the multiple images onto the mirror 760 with subsequent projection onto projection surface 750 from a single video display device 710. A single video display device 710 can also be used to project images onto more than three or less than three projection surfaces.

Figure 8A:
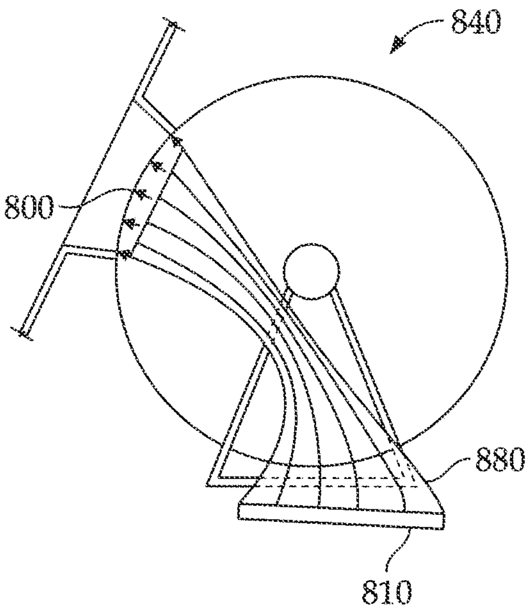
FIGS. 8A and 8B are side views of the display region of a gaming machine illustrating additional projection systems in accordance with embodiments of the invention.
Figure 8B:
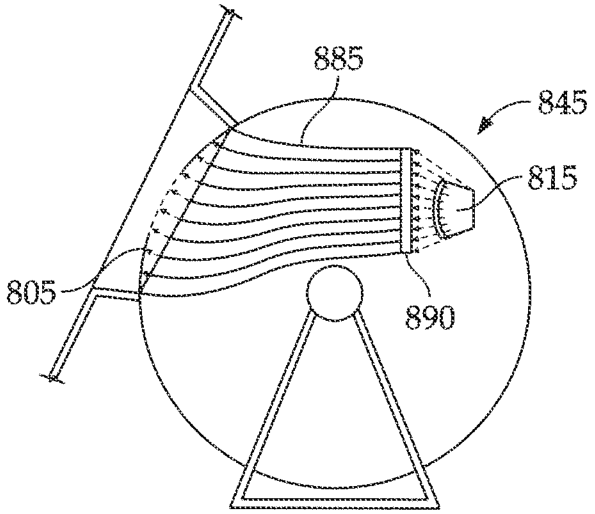

FIGS. 8A and 8B illustrate the use of light piping or an image conduit to project an image from a video display device 810 onto a projection surface 800. An image conduit typically comprises a number of multifiber bundles of single fibers that are fused together to carry an actual image. The single fibers used to build the image conduit are a simple form of fiber optics and are typically available in diameters from about 0.020 to 2.0 millimeters, but smaller or larger structures can be used for certain applications. An image conduit can be bent to almost any desired path for projecting the image from the video display device 810 onto the projection surface 800. For example, with a video display device 810 placed behind a motor or other object, an image conduit could be used to carry the image projected from the video display device 810 around the motor and onto a projection surface viewable by a player of a gaming machine. The image conduit makes the image at the first surface (e.g., near the video display device 810) appear as though it is "on" the second surface (e.g., the projection surface), which is the surface that the player views.

In the embodiment illustrated in FIG. 8A, the video display device 810 is a flat element that is coupled to image conduit 880. The video display device 810 and image conduit 880 can be located outside of the space defined by a rotatable mechanical structure 840. The rotatable structure 840 can comprise the projection surface 800 or the projection surface 800 can be mounted to the rotatable structure 840. As illustrated in FIG. 8A, the image conduit 880 can bend to enter the space defined by the rotatable structure 840 to project images from the video display device 810 to the projection surface 800. In the embodiment illustrated in FIG. 8B, a video display device 815 can project an image onto a transparent layer 890. An image conduit 885 on the opposite side of the transparent layer 890 can then carry images onto projection surface 805 for viewing by the gaming machine player. Similar to FIG. 8A, the projection surface 805 can be mounted to a rotatable mechanical structure 845.

In certain embodiments, an image conduit can act as a multiplexing optical device for splitting a video feed from a video display device. Such an application of an image conduit can be beneficial, for example, where a video display device is used to project images onto a plurality of projection surfaces, as illustrated, for example, in FIGS. 7A-7B. The image conduit for such a configuration is divided into one separate section for every projection surface the image conduit provides images. In the example of a five reel slot machine using one video display device, the image conduit is divided in five sections. Each section of the image conduit carries an apportioned image from the video display device to a lensing element which projects the image onto the respective projection surface on the respective reel strip.

In certain embodiments, an optical waveguide can carry an image from a projection source such as a video display device to a wedge-shaped planar light guide where the image can be reflected onto the wedge shape and subsequently be projected onto a projection surface in the gaming machine. The path the optical waveguide can take before the image is displayed on the projection surface can include any of a number of routes in the gaming machine, such as between the slot reels. The use of a wedge waveguide display in a gaming machine is described in International Publication No. WO 2007/030781 A2, entitled "Wagering Game System With Waveguide Projection Display", which was previously incorporated herein by reference in its entirety.

While several embodiments of a gaming machine have been described herein, various combinations of the support systems, drive mechanisms and projection systems illustrated in FIGS. 3-8 are contemplated.

Figure 9A:
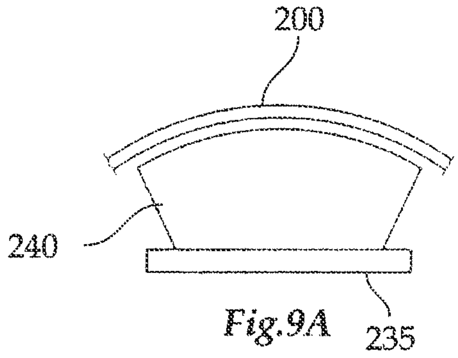
FIGS. 9A and 9B are a side view and an end view, respectively, of the display device for use in the display region of the gaming machine in accordance with yet another embodiment of the invention.
Figure 9B:
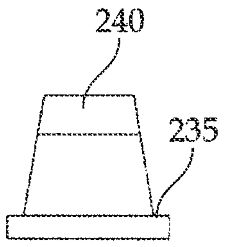

FIGS. 9A and 9B illustrate an alternative embodiment in which a flat panel video display 235 projects images upwardly through a lens 240 on to the transparent layer 200. Thus, in addition to a curved video display device, a lens 240 or a lens system (e.g., a plurality of fiber optic lenses) can be used to provide the curvature needed to project the images on to the transparent layer 200.

Figure 10A:
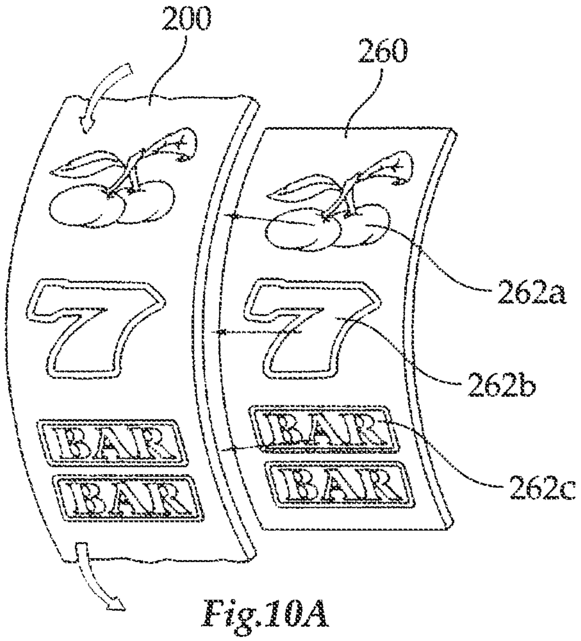
FIGS. 10A and 10B are a perspective view and a side view, respectively, of an OLED display device for use in the display region of the gaming machine in accordance with yet another embodiment of the invention.
Figure 10B:
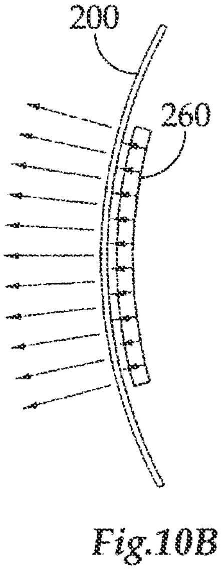

FIGS. 10A and 10B illustrate yet another alternative embodiment in which a curved organic light-emitting diode (OLED) display 260 is used to project moving symbols onto the transparent layer 200. Like the other video displays, the OLED display 260 provides a plurality of images of symbols 262*a*, 262*b*, 262*c* that are used to indicate a randomly selected outcome of the wagering game. In addition to the use of an OLED display 260, which operates on the principal of electroluminescence, the gaming machine 10 can also use a polymeric light emitting diode (PLED) display as well.

In an alternative embodiment, the transparent layer 200 is replaced by a typical reel strip having permanent symbols. The OLED display 260 is then used for backlighting the reel strip and highlighting certain features on the reel strip. For example, if a symbol is a part of the winning symbol combination, the OLED display 260 can provide highlighting (e.g., flashing stars) around that winning symbol.

Figure 11A:
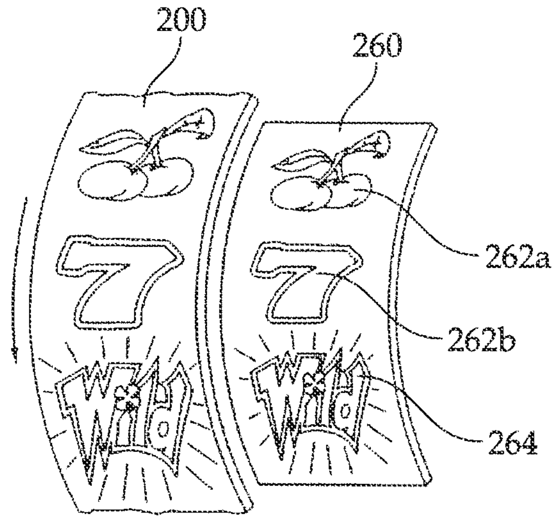
FIGS. 11A and 11B illustrate other types of image enhancements that can be obtained by the various embodiments of the present invention.

While the previous embodiments have described the use of the video display devices 160, 210, 235, 260 providing images of symbols for indicating a randomly selected outcome as in a typical mechanical-reel slot machine, the video display devices 160, 210, 235, 260 also provide for various effects that are not available in a typical mechanical-reel slot machine. For example, FIG. 11A illustrates the individual "BAR" symbol 262*c* of FIG. 10A being dynamically changed to a "WILD" symbol 264. This change may occur while the symbol 262*c* is in motion, or after the symbol 262*c* has come to a rest. The change may be a gradual "morphing" of the symbol, or it can be an instantaneous transition.

Figure 11B:
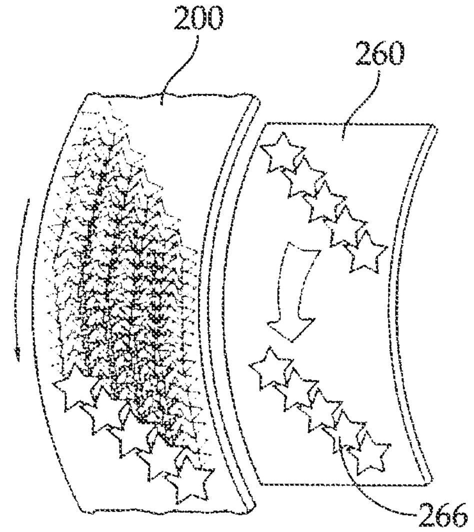

FIG. 11B illustrates the fact that all of the symbols 262 of FIG. 10A can be completely changed to other symbols during motion or after the symbols 262 have come to rest. As shown, the symbols 262 of FIG. 10A have been changed to a "SHOOTING STAR" symbol 266 during motion of the images produced by the video display device 260. For example, the "SHOOTING STAR" symbol 266 may indicate that a positive outcome will occur when the reels come to a stop, providing the player with enhanced excitement. In short, the video display devices 160, 210, 235, 260 provides flexibility to add various enhancements to the overall player experience at the gaming machine 10.

Figure 12A:
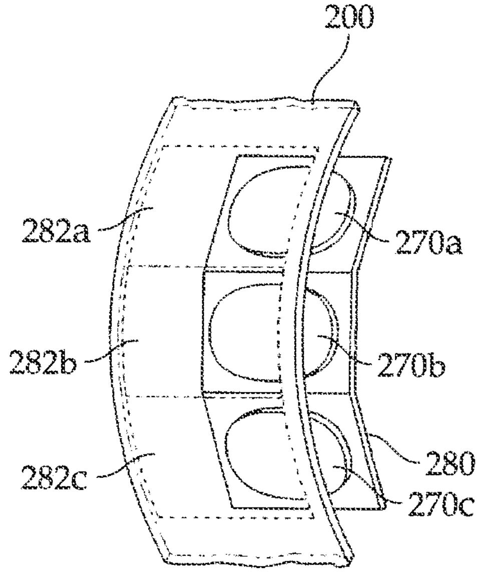
FIGS. 12A and 12B are a perspective view and a side view, respectively, of a multi-unit display device for use in the display region of the gaming machine in accordance with yet another embodiment of the invention.
Figure 12B:
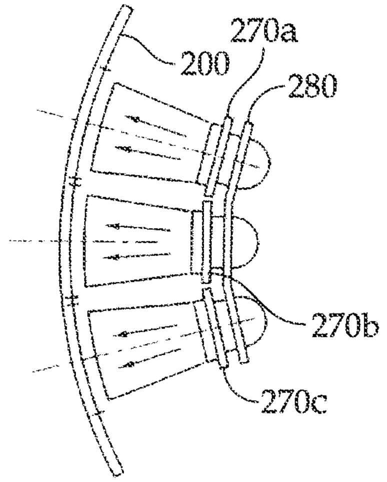

While FIGS. 3-11 illustrate one continuous video display device 160, 210, 235, 260, 610, 710, 810, 815 for providing the images, FIGS. 12A-12B disclose an alternative embodiment in which three distinct video display devices 270*a*, 270*b*, 270*c* provide images that abut, or overlap, each other when projected onto the transparent layer 200. Each of the video display devices 270*a*, 270*b*, 270*c* is preferably mounted on one printed circuit board 280 and are controlled by one controller. Each of the video display devices 270*a*, 270*b*, 270*c* provides images at locations 282*a*, 282*b*, 282*c* on the transparent layer 200. Accordingly, an image of the symbol is first projected by the video display device 270*a*. As the image moves downwardly, it is the projected by the video display device 270*b* and, finally, by video display device 270*c*. Thus, a portion of a single image of a symbol (e.g., a "SEVEN" symbol), as seen by the player, can be projected by the video display device 270*a* and the video display device 270*b* as that image moves between (i.e., straddles) the symbol location 282*a* and the symbol location 282*b* on the transparent layer 200.

Although the embodiments of FIGS. 5-11 have been shown with respect to the rotating transparent layer 200, 700, 800, 805, it should be understood that each of these embodiments can be used with a static transparent layer, such as the transparent layer 150 of FIG. 3.

Figure 13:
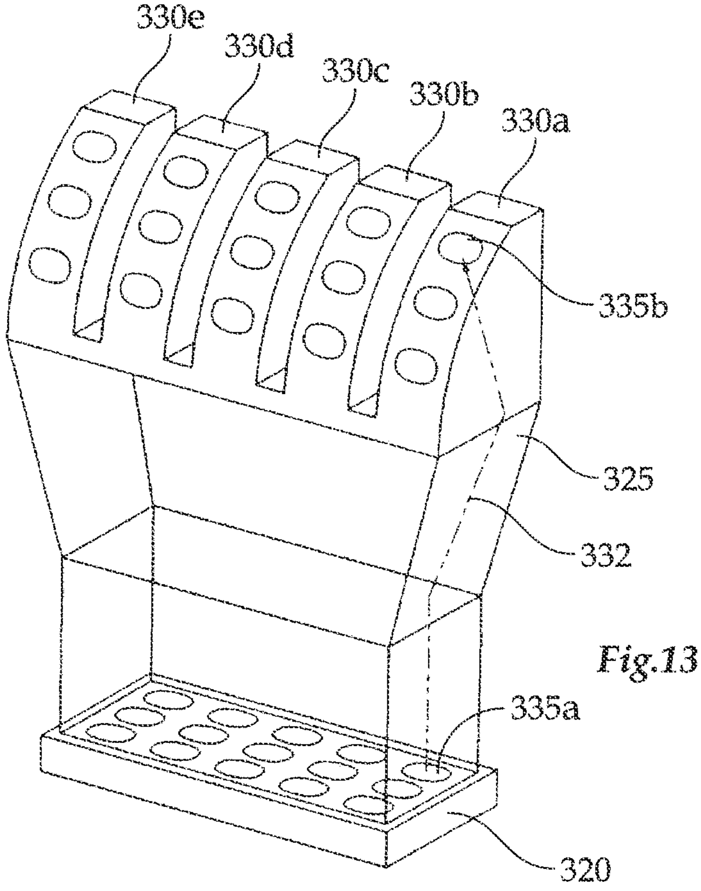
FIG. 13 is a perspective view of the display region of the gaming machine in accordance with yet another embodiment of the invention.

FIG. 13 illustrates an alternative embodiment in which a flat-panel video display 320 (e.g., an LCD display) projects images through a formed light pipe 325 or image conduit (e.g., an image carrier comprising a fusion of coherent bundles of fused single fibers that behave mechanically like a single glass fiber) to five output stations 330*a*-300*e*. Each of the plurality of output stations 330*a*-330*e* corresponds to one reel on the gaming machine 10. For example, as a video image leaves a segment 335*a* of the video display device 320, the image follows a path 332 through the light pipe 325, leading to a corresponding segment 335*b* along the first output station 330*a*.

As shown, the system of FIG. 13 can be used with a stationary transparent layer, such as the transparent layer 150 of FIG. 3. Or, the video display device 320 can be located closer to the plurality of output stations 330 such that the dimensions of the light pipe 325 are reduced. Thus, the video display device 320, the light pipe 325, and the output stations 330 may fit within the internal diameter of the rotating transparent layer 200, 700, 800 of FIGS. 4-11. In summary, FIG. 13 illustrates embodiment in which one video display device 320 results in images projected from five distinct output stations 330.

FIG. 14 illustrates an alternative embodiment with a conventional mechanical reel strip 350 having a plurality of predefined symbols. The symbols on the mechanical reel strip 350 are altered or highlighted by an OLED device 360, which is partially transparent, located over the mechanical reel strip 350. For example, the OLED device 360 can provide a color highlighted region 362 when a certain symbol (e.g., a "SEVEN" symbol) is achieved, resulting in a winning symbol combination or the triggering of a bonus game. The OLED device 360 can also highlight a "scatter" payout symbol. The highlighting provided by the OLED device 360 can be static or dynamic. Alternatively, the OLED device 360 can provide additional images that overlay the underlying symbols of the reel strip 350. As such, the OLED device 360 can provide paylines that traverse one reel, or a plurality of reels for indicating winning symbol combinations. Alternatively, the OLED device 360 can highlight a winning payline or indicate which payline(s) the player has selected.

Similarly, a conventional mechanical reel strip having translucent properties can be placed in front of the OLED device so that the OLED device provides images, lighting, and highlighting from behind the conventional mechanical reel strip. For example, referring back to FIG. 10*a*, assuming the transparent layer 200 is a convention reel strip, the OLED device 260 can provide addressable animation and highlighting. Winning symbols or a combination of symbols can be highlighted on the conventional mechanical reel strip by the projection of images from the OLED device 260. Likewise, unique shapes and graphics, as well as words, can be projected from the OLED device 260 during or after the spinning of the conventional mechanical reel strip.

FIGS. 15A and 15B illustrate an alternative embodiment of the display region 14 of the gaming machine 10. In this embodiment, a rotating drum includes a layer of "electronic paper" 400 having the ability to create and remove images by placing an electronic charge on the material. "Electronic paper" 400 can come in various forms and generally includes miniature conductive items, such as spheres, that can be rotated in a certain direction in response to an applied electronic signal. The applied electronic signal causes a known surface (having a certain color, or black and white portions) on the miniature conductive item to appear in a certain direction. By applying the electronic signal at known locations, an image can be created on the electronic paper.

FIG. 15A illustrates electronic charge stations 410*a* and 410*b* just prior to the display region 14 and electronic discharge stations 420*a* and 420*b* subsequent to the display region 14. The electronic charge stations 410*a* and 410*b* apply an electronic signal to the electronic paper 400 at known locations to produce certain symbols. For example, as shown best in FIG. 15B, the electronic charge stations 410*a* and 410*b* first create the "BAR" symbol 422*c* as the electronic paper 400 moves downwardly (see the arrow in FIG. 15A). Next, the electronic charge stations 410*a* and 410*b* create the "SEVEN" symbol 422*b* as the electronic paper 400 continues moving in the downward direction. Finally, the electronic charge stations 410*a* and 410*b* creates the "CHERRY" symbol 422*a* as the electronic paper 400 continues the downward movement. As the electronic paper 400 continues movement, the electronic charge stations 410*a* and 410*b* continue to create symbols as they move into the display region 14. The manner in which the electronic charge stations 410*a* and 410*b* create the symbols is a function of the angular velocity of the electronic paper 400.

Once a symbol leaves the display region 14, the electronic discharge stations 420*a* and 420*b* create a neutral mode in the electronic paper 400. For example, the electronic paper 400 receives an electronic charge that causes the movable miniature items (e.g., spheres) in the electronic paper 400 to be placed in all the same direction. In short, the purpose of the electronic discharge stations 420*a* and 420*b* is to place the electronic paper 400 in a known mode or format before it reenters the electronic charge stations 410*a* and 410*b*. The electronic discharge stations 420*a* and 420*b* can be considered to perform a "removal" or "erase" function. The electronic charge stations 410*a* and 410*b* and the electronic discharge stations 420*a* and 420*b* can be powered by the power from the gaming machine.

In an alternative embodiment of FIGS. 15A-15B, instead of the images being dynamically changed during the rotation of the electronic paper 400, the images are changed between wagering games. For example, a player could play four sessions of the basic wagering gaming using the same set of images on the electronic paper 400. During the fourth session, the player may achieve a bonus-game triggering event. At that time, the electronic discharge stations 420*a* and 420*b* would "erase" the images from the electronic paper 400 and the electronic charge stations 410*a* and 410*b* would create new images of symbols for a bonus game involving the spinning of one or more reels containing the electronic paper 400.

In a further alternative embodiment that can be represented relative to FIGS. 15A-15B, the electronic paper 400 can be replaced by a rotating layer material that receives printed matter. The electronic charge stations 410*a* and 410*b* would be considered "printing" stations for adding material at known locations to create symbols. The electronic discharge stations 420*a* and 420*b* would be considered "erasing" stations for removing that material from the rotating layer of material. In such an embodiment, a video display device may be located internal to the rotating layer of material to create the illusion of symbols spinning. The "printing" stations only begin to function to print on the rotating layer material when it slows to a velocity at which the eye can perceive a symbol. As one example, the "printing" stations can apply a UV-sensitive material to create the symbols and the "erasing" stations can remove the symbols through the application of UV light.

In the various embodiments described with respect to FIG. 15, the fixed symbols created on the moving medium allow for random outcomes to be displayed in accordance with "virtual reel stops." Thus, once the random number generator determines the outcome, that outcome corresponds to a certain symbol on each reel being displayed at an appropriate position in the display region, typically along an active payline. One such method for creating these virtual reel stops is disclosed in U.S. Pat. No. 4,448,419, which is herein incorporated by reference in its entirety.

Figure 16:
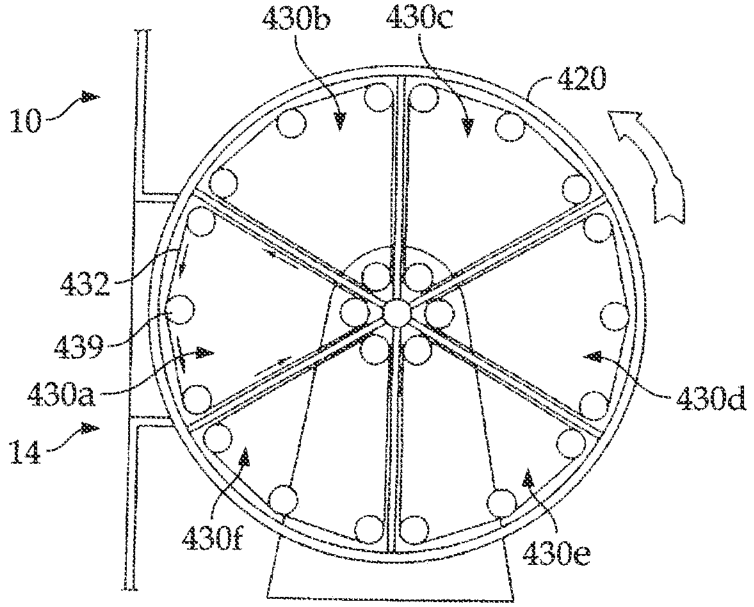
FIG. 16 is a side view of the display region of the gaming machine in accordance with yet another embodiment of the present invention.

FIG. 16 illustrates an embodiment in which the symbols in the display region 14 of the gaming machine 10 are provided by a plurality of cassettes 430. Six distinct cassettes 430*a*-430*f* are located within a transparent layer 420, although more or less cassettes 430 can be used. Further, the transparent layer 420 may not be needed in some embodiments. As shown in FIG. 16, the first cassette 430*a* is located within the display region 14 and includes a reel strip 432 that is wrapped around a plurality of rollers 439. To move the reel strip 432, one of the rollers 439 is driven by a motor (not shown) to cause the reel strip 432 (with its associated symbols) to move through the display region 14. One example of the cassette 430 is the Flexi-Strip Reel Mechanism from the Starpoint Company of Chessington, Surrey, of the U.K. (http://www.starpoint.uk.com/Starpoint_WS/Gaming_Views/Flexistrip/), which is herein incorporated by reference in its entirety.

In the preferred embodiment, each cassette 430 includes a different set of symbols for playing different wagering games. For example, the cassettes 430*a*-430*c* may include symbols for playing three different basic wagering games, while the cassettes 430*d*-430*f* may include symbols for playing three different bonus games. After a first wagering game has been completed with the cassette 430*a* having a first group of symbols, the CPU 34 of the gaming machine 10 can then rotate the drum mechanism to place the cassette 430*b* in the display region 14 such that the a second group of symbols on its reel strip can be displayed to the player during a second wagering game. The gaming machine 10 has one of the drum mechanisms containing the cassettes 430 in FIG. 16 for each reel, such that a three-reel gaming machine 10 includes three mechanisms shown in FIG. 16.

In an alternative embodiment of FIG. 16, the six distinct cassettes 430*a*-430*f* each provide a known subset of the overall symbol group around the drum. Thus, the "reel strip" is comprised of six segments, each segment being provided by one cassette 430. In this alternative embodiment, the entire drum rotates like a typical reel to place symbols in the display region for indicating the randomly selected outcome. To alter the symbols in the overall symbol group, one or more cassettes 430 can use their internal rollers and place new symbols on the circumference of the drum. This symbol alteration can be done while the drum is stationary or spinning.

Figure 17:
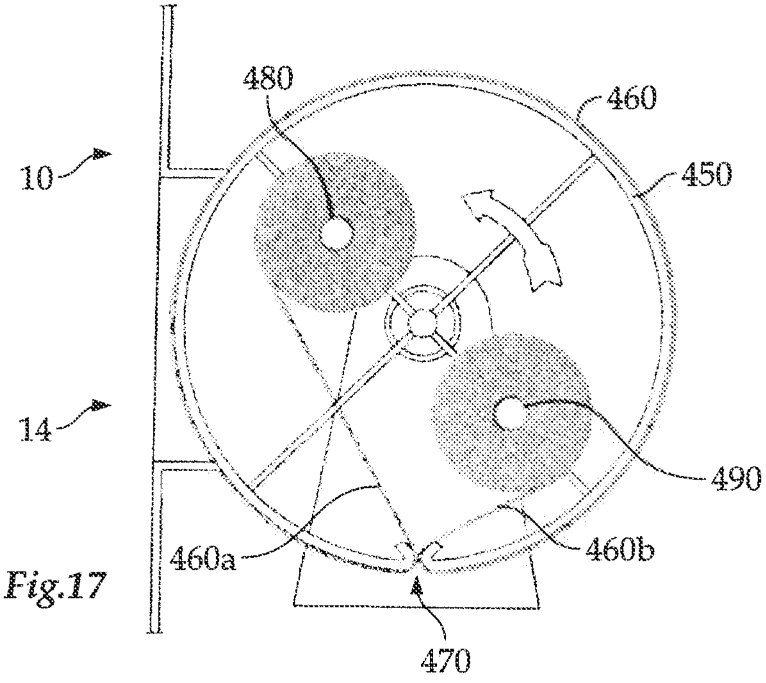
FIG. 17 is a side view of the display region of the gaming machine in accordance with yet a further embodiment of the present invention.

Following the general theme of FIG. 16, FIG. 17 also illustrates an embodiment in which multiple lengths of reel strips having different groups of permanent symbols can be displayed at different times. As shown in FIG. 17, a rotatable drum includes an outer structure 450 having a circumference on which a first length of reel strip 460 can be placed. Additionally, a second length of reel strip 460*a* is located internal to the drum via a gap 470 and is wrapped around a roller 480. Further, a third length of reel strip 460*b* is located internal to the drum via the gap 470 and wrapped around a roller 490. In other words, there are three continuous lengths of the reel strips 460, 460*a*, and 460*b*, each of which includes a distinct group of symbols. During the wagering game, the entire drum rotates through the display region 14 such that the symbols on the reel strip 460 are repetitively displayed to the player during rotation, just like a conventional mechanical reel.

To advance the first length of reel strip 460 inwardly and display the second length 460*a* on the outer structure 450, the roller 490 is driven (by a motor) to cause the first length of reel strip 460 to be wrapped around that roller 490, while simultaneously pulling the second length 460*a* from the second roller 480 onto the outer structure 450. The opposite actions can be taken to advance the third length 460*b* onto the outer structure 450. For each length of reel strip, a different wagering game can be played with the different group of symbols, as discussed above with respect to FIG. 16. Typically, the changes of the reel strip lengths 460, 460*a*, 460*b* occur on the outer structure 450 while the drum is stationary. However, it is also possible to create this change while the drum is in motion. And while two rollers 480, 490 are shown, an alternative embodiment would include four rollers. Two of the four rollers work together to provide the reel strip for half of the circumference and the other two rollers work together to provide the reel strip for the other half of the circumference. In this alternative, two gaps 470 would be needed. The two gaps 470 would preferably be located at 180° from each other.

Figure 18:
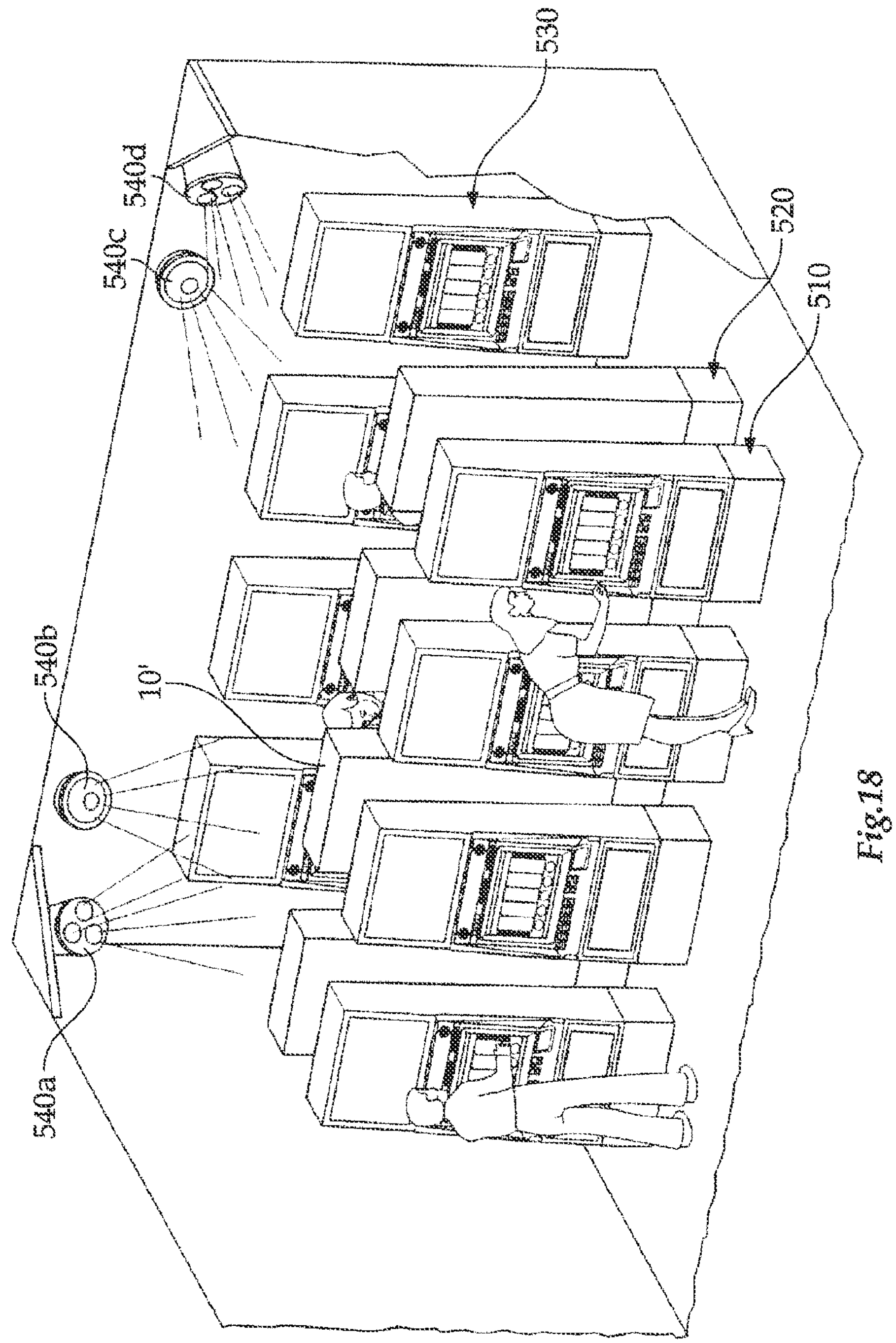
FIG. 18 is a perspective view of a typical gaming environment having a plurality of gaming machine banks.

FIG. 18 illustrates the typical gaming environment in which there are a plurality of gaming machines 10. Each of the gaming machines 10 is arranged in one of several gaming machine banks 510, 520, and 530. The gaming environment also includes a plurality of lights 540*a*-540*d* that are positioned around the first, second and third banks 510, 520, and 530. On any given gaming machine 10, the various lights from the gaming environment affect the viewing of the display region 14 (FIG. 1). The ambient light includes various sources of lights, such as the plurality of lights 540*a*-540*d* and light from other adjacent gaming machines 10. For example, the gaming machine 10' that is located in the second bank 520 is affected by each of the plurality of lights 540*a*-540*d*, as well as the light emitting from the gaming machines in the third bank 530. If the gaming machine 10' were a mechanical slot machine, these ambient lights would have an effect on the manner in which the player visualizes the symbols on the mechanical reels in the display region 14 due to shadowing or "spectral highlights" (discussed below) on the mechanical reel. However, if the display region 14 of the gaming machine 10 includes a typical video display, these ambient light sources have a minimal effect on the video images because of their inherent brightness in transmitting light toward the player from the display region 14.

Figure 19B:
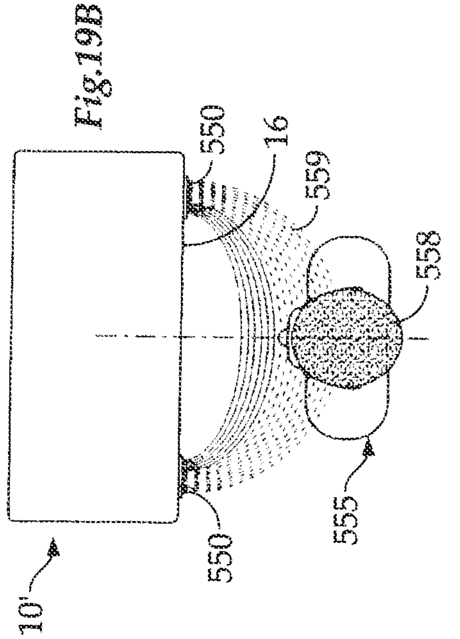
FIGS. 19A, 19B and 19C are different views of one gaming machine allowing for adjustments based on a player's position within the typical gaming environment of FIG. 18.
Figure 19C:
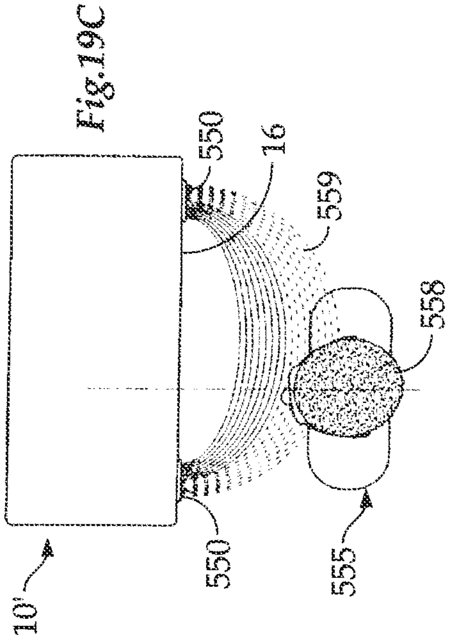
Figure 19A:
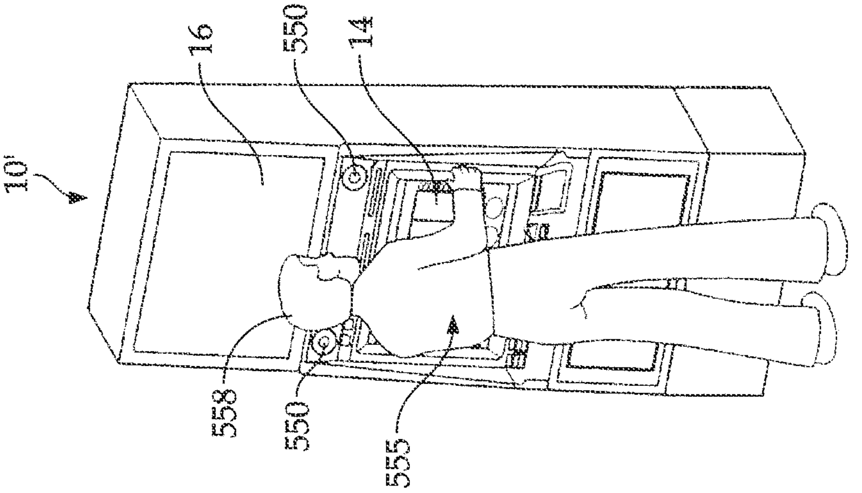

FIG. 19A illustrates a perspective view of the gaming machine 10' of FIG. 18, which includes a video display device in the primary display 14 and a pair of sensors 550. The sensors 550 can perform one or more functions and are typically coupled to the CPU 34 (FIG. 2) of the gaming machine 10. For example, the sensors 550 can find the location of the player 555 relative to primary display 14 or the location of the head 558 of the player 555 relative to the primary display 14. The sensors 550 can also be used to determine the location (and intensity and/or color) of various sources of ambient light located behind the player 555. As discussed in more detail below, the inputs from the sensors 550 allow for "environmental mapping" of the images of the video reels providing a 3-D effect. When doing so, the head 558 of the player 555 (or the eyes of the player) become the location of a "virtual camera" that is used to alter the images on the video reels. As such, the virtual camera allows for 3-D rendering of the images on the display 14 in response to the location of the player. In this example, the sensors 550 include e-field sensors for location determination. Example e-field sensor chips are available through Freescale Semiconductor of Austin, Tex. The e-field sensor is a non-contact location sensor and contains circuitry necessary to generate a low level electric field 559 in a semi-circular arc between a set of electrodes on each of the sensors 550 as shown in FIG. 19B which is a top view of the gaming machine 10' of FIG. 19A. The e-field sensor measures the field loading caused by conductor objects, such as the head 558, that move into the low level electrical field 559 in FIG. 19B. A low frequency sine wave is generated via the low level electrical field 559. The frequency can be adjusted using an external resistor and can also be optimized for a certain frequency, such as 125 kHz. The sine wave can have very low harmonic content to avoid the generation of harmonic interference. The detected object can act as a capacitor to a virtual ground while the electrode forms the other capacitor plate. The current flowing between the electrode and its surrounding virtual ground will result in a voltage drop across the internal resistance. This, in turn, can lead to a voltage change at the electrode. The signals for the set of electrodes may be analyzed to determine both the position and the size of the object. For example, the voltage can change at the electrode (for the e-field sensors, for example) in the sensors 550 when the object such as the player's head 558 moves to a different location as illustrated in FIG. 19C. The interposition of the object in the low level electrical field 559 at a different position will result in a different voltage at the electrode. The set of electrodes may be of sufficient area roughly corresponding to a player's head in order to provide optimal object detection. In order to increase the number of electrodes, multiple electrodes in an array may be used with a multi-plexing arrangement.

The gaming machine 10' can generate 3-D effects in real-time with a 3-D engine. The result is a much more interactive and interesting environment for the gaming player. In one embodiment, the 3-D virtual controls may be implemented using a game design package such as RenderWare Studio 2.0 running, for example, on a processor designed by Intel or AMD. The views of the simulated mechanical reels on the display 14 are 3-D views of the gaming environment designed or configured to present the mechanical reels of a desired theme or game. The theme is filmed in a 3-D gaming environment using at least one virtual camera that renders a sequence of two-dimensional (2-D) images or photographs derived from 3-D objects (e.g., the themed reels) in the 3-D gaming environment. A 3-D position of each 3-D object in the 3-D gaming environment in the sequence of 2-D images is defined by a position of the virtual camera in the 3-D gaming environment. A sequence of positions of the virtual camera in the 3-D gaming environment used to film the theme may be pre-selected, or the sequence of positions of the virtual camera may be controlled by a player at the gaming machine 10'. Alternatively, a physics engine may be implemented that realistically animates physical objects within the gaming environment.

The 3-D views of the gaming environment of the present invention are displayed in real-time on the display 14. In a real-time determination and display embodiment, game activity is shown on the display 14 at substantially the same time that the underlying mathematical basis for the displayed game activity is being calculated. Furthermore, according to the present invention, the activities and movement of each of the simulated reels in the display 14 occur simultaneously. For example, a first sequence of photographs for the first reel generated from a virtual camera in the gaming environment is displayed simultaneously with a second sequence of photographs for the second reel generated from the virtual camera. More than one virtual camera may also be used. This technique is sometimes referred to as "rendering on the fly."

If the location of the player's head 558 and the location of sources of ambient light (or other objects) are known via the e-field sensor described above, the location of "spectral highlights" produced by light sources external to the gaming machine 10' on the simulated mechanical reels of the primary display 14 can be determined. A "spectral highlight" is a bright spot (or highlighted spot) of reflected light that appears on an object, such as a mechanical reel, when that object is illuminated (i.e., a "glare" of reflected light off the surface). A "spectral highlight" is important for a player's perception because it provides a visual clue of the shape of the object (i.e., the simulated mechanical reel) and its location with respect to ambient light sources. The "spectral highlight" may be automatically adjusted depending on the location of the player's head 558 as determined by the e-field sensors in the sensors 550.

Figure 20A:
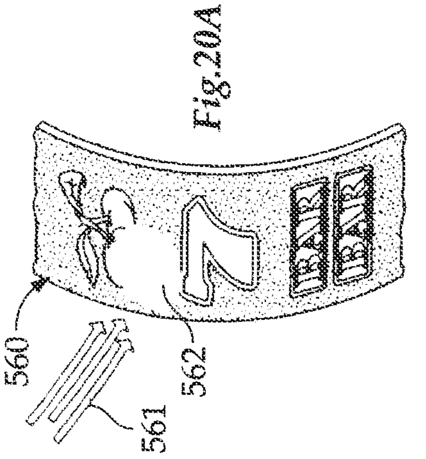
FIGS. 20A, 20B and 20C illustrate variations to the images of the reels strips produced by the video device in response to changes in the gaming environment surrounding the gaming machine of FIG. 19.

For example, FIG. 20A illustrates the effect of ambient light 561 from a source external to the gaming machine 10' on the far left video reel 560 (i.e., the simulated mechanical reel) in the primary display 14 of the gaming machine 10'. If the locations of the player's head 558 and the ambient light source are known such as by the e-field sensor described above, then the location of the spectral highlight 562 on the video reel 560 is known. Accordingly, real-time changes are made to the images of the video reel 560 displayed in the primary display 14 to take into account the spectral highlight 562 caused by the environment. Additionally, the size, shape, and color of the spectral highlight 562 can also be added to the video reel 560, assuming additional characteristics of the ambient light are detected by the sensors 550 (or other sensors associated with the gaming machine 10). The present invention also contemplates multiple spectral highlights 562 on one video reel 560 and spectral highlights on multiple video reels.

Figure 20B:
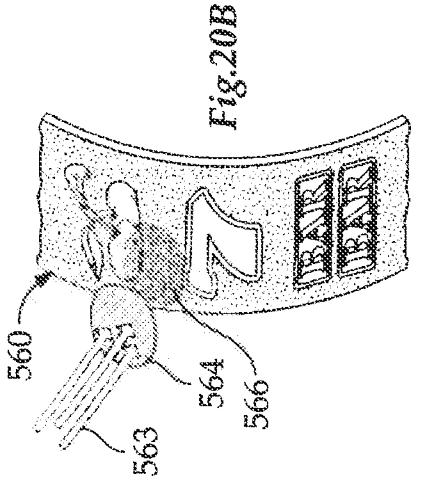

In another example, FIG. 20B illustrates the effect of shading on the video reel 560. As shown, ambient light 563 from a source should normally be impinging on the entire video reel 560. However, an object 564 that would normally create a shadow on the video display 14 is detected by the sensors 550. Knowing the location of the object 564 and the ambient light 563, computations can be made to determine where to create a virtual shadow 566 on the reel 560. The object 564 can be the player (himself or herself) and thus have the location determined via an e-field sensor as explained above. Or, the object 564 may be another person in the vicinity of the gaming machine 10'. When the object 564 moves, the shadow 566 on the video reel 560 can also move in accordance to the location of the object 564. The shadow 566 (or shaded region) is created by variations in color and brightness of the light being emitted from the video reel 560.

Figure 20C:
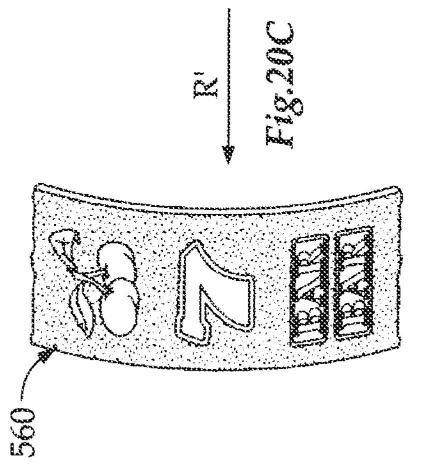

In a further example of environmental mapping, FIG. 20C illustrates how the radius of curvature R' of the image increases in the video reel 560 as the player moves to the left. This is often referred to as the "parallax" effect, which causes different points on a surface to move different distances relative to the background when the viewing point (i.e., the "virtual camera") moves. In other words, if the player's head 558 is at the far right of the gaming machine 10', the radius of curvature of the edge of the video reel 560 should appear to be small such that more curvature is visualized. But, as a player's head 558 moves to the left to a point where the head 558 is directly positioned over that video reel 560, the edge of the video reel should been nearly linear in the vertical direction (i.e., the radius of curvature R' has increased). Further, the dimensions of the symbols can also change based on the location of the player (i.e., movement of the "virtual camera") detected by the e-field sensor.

In summary, the sensors 550 on the gaming machine 10' in FIG. 19 allow for "environmental mapping" to provide modifications to the images on the video reels 560 (FIG. 20)

due to the real-time sensing of external stimuli, such as the sensing of lights and the location of the player and other objects. This allows the video reel 560 (i.e., the simulated mechanical reel) to appear to be more like a mechanical reel, which reflects certain wavelengths of light and cause shadowing in response to the same external stimuli.

Figure 21:
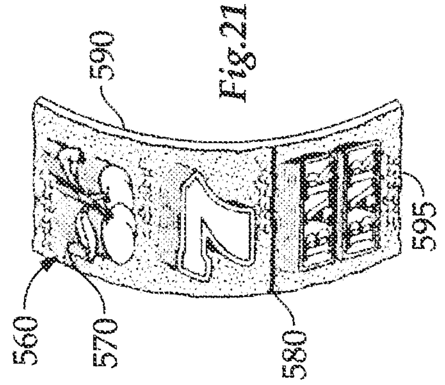
FIG. 21 illustrates variations to the images of the reels strips produced by the video device that replicate typical imperfections located on a mechanical reel strip.

FIG. 21 provides additional visual effects that allow for the video reel 560 to be more like a mechanical reel. In particular, FIG. 21 illustrates certain imperfections that are present in a mechanical reel that can be visually replicated in the video reel 560. For example, while the images of the symbols are undergoing motion, a trail of the symbol can follow the symbol resulting in a motion blur 570. "Motion blur" is what the human eye perceives if a fast-moving object (e.g., the symbol on a fast-moving mechanical reel) is moving relative to other objects. In other words, as different video reels 560 in the display region 14 are stopped, the "motion blur" 570 may be present on some of the reels that are still spinning, while the "motion blur" 570 is not present on other video reels that are moving slowly or stopped.

As another example of a visual imperfection, the video reel 560 of FIG. 21 includes a seam 580, which is commonly present on the reel strip of a mechanical reel. This seam 580 is the location work to edges of the reel strip meet on the reel.

As another example of a visual imperfection, the video reel 560 of FIG. 21 includes an imperfect edge 590 which appears to jitter, wobble or sway. This type of undesirable motion is often present on mechanical reels and can be produced in a 3-D model of a reel drum or reel cage that is used to create the images. Alternatively, this jitter, wobble or sway can be produced by locating the video display on a structure that rotates, such as the video device 210 on the mounting structure 230 in FIG. 4A.

In certain embodiments, the video display device 210 is secured to the mounting structure 230 and the projection surface (e.g., a screen, reel strip, transparent layer) is mounted to a structure that rotates (e.g., reel cage). During the spinning of the reel cage, the mounting structure can have a first type of movement and the reel cage can have a second type of movement. For example, the reel cage can have an out-of-round condition and an out-of-square condition. These two conditions, either alone or combined, can cause a left-to-right wobble that would be seen during the spinning of the reel. The projection of a wobble, sway or jitter can be synchronized between the video display device and the projection surface using a method of detecting the amount of wobble and transmitting that information to the video display device so that the projected image moves left-to-right to simulate the imperfection.

As yet another example of a visual imperfection, the video reel 560 of FIG. 21 includes a textured or bumpy region 595 that is common on the material (e.g., laminated plastic) used to make the reel strips for mechanical reels. In other words, the material used to make a mechanical reel strip often includes some of these inherent imperfections (or others, such as wrinkles) and the video reel 560 can display a few of these imperfections.

Figure 22:
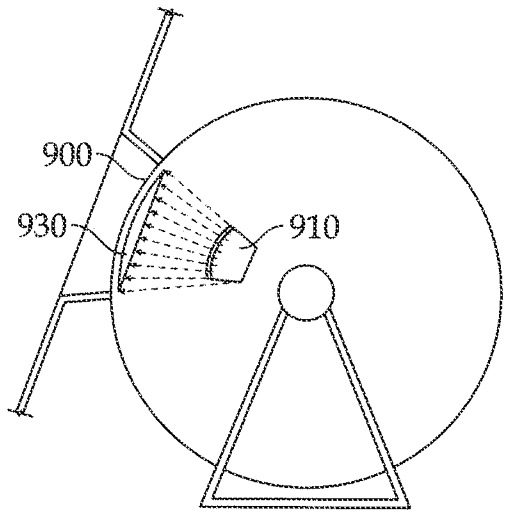
FIG. 22 is a side view of the display region of a gaming machine in accordance with yet a further embodiment of the invention.

Simulating visual imperfections associated with a mechanical reel slot can also be included in a gaming machine using lenses to make an image from a video display device appear more like a mechanical reel by including, for example, intentional imperfections that may occur in a mechanical reel system. FIG. 22 illustrates a certain embodiment in which a lens 930, similar to a fish-eye lens, can be used. A video display device 910 projects an image into the lens 930 which subsequently projects the image onto the transparent layer 900. The lens 930 can reduce horizontal distortions and can also create an illusion of bending or a curved surface in the vertical direction, which may be observed on a mechanical gaming device.

In certain embodiments, the implementation of visual imperfections in a video reel 560 (see, e.g., FIG. 21) are contemplated using a mechanical vibrator or shake device. The mechanical vibrator or shake device can be rigidly or semi-rigidly connected to a common structure 170 (see FIG. 3) or mounting structure 230 (see FIG. 4) that supports a video display device 160, 210 or that is placed in direct contact with transparent layer 150, 200 or video reel 560 to simulate a wobble. As illustrated in FIGS. 4A, 15A and 16, in certain embodiments, the transparent surface 150, 200 (or "electronic paper" 400 or reel strip 432) is rotated to simulate imperfections while the video display device remains stationary. Visual imperfection can also be implemented using a combination of simulated imperfections in the video display device along with the actual mechanical imperfection discussed herein.

Figure 23:
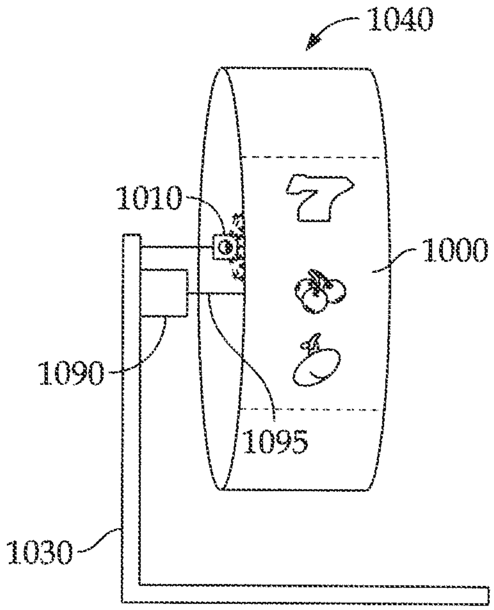
FIG. 23 is a perspective view of a rotatable mechanical structure of a gaming machine in accordance with embodiments of the invention.

FIG. 23 illustrates a rotatable mechanical structure 1040 having a transparent layer 1000. A video display device 1010 projects an image onto the transparent layer 1000. The video display device 1010 is secured to a mounting structure 1030. A motor 1090 is also secured to the mounting structure 1030. The motor 1090 has a rotating pin 1095 extending therefrom which is connected to the rotatable structure 1040. The motor 1090 can be rigidly or semi-rigidly secured to the mounting structure 1030 in a manner that allows mechanical vibrations or imperfections from the operation of the motor 1090 to be transmitted to the rotatable structure 1040 and/or to the video display device 1010. The video display device can also be rigidly or semi-rigidly secured to the mounting structure 1030 in a manner that allows mechanical vibrations or imperfections from the operation of the motor 1090 to be transmitted through the mounting structure 1030 to the video display device 1010.

Figure 24:
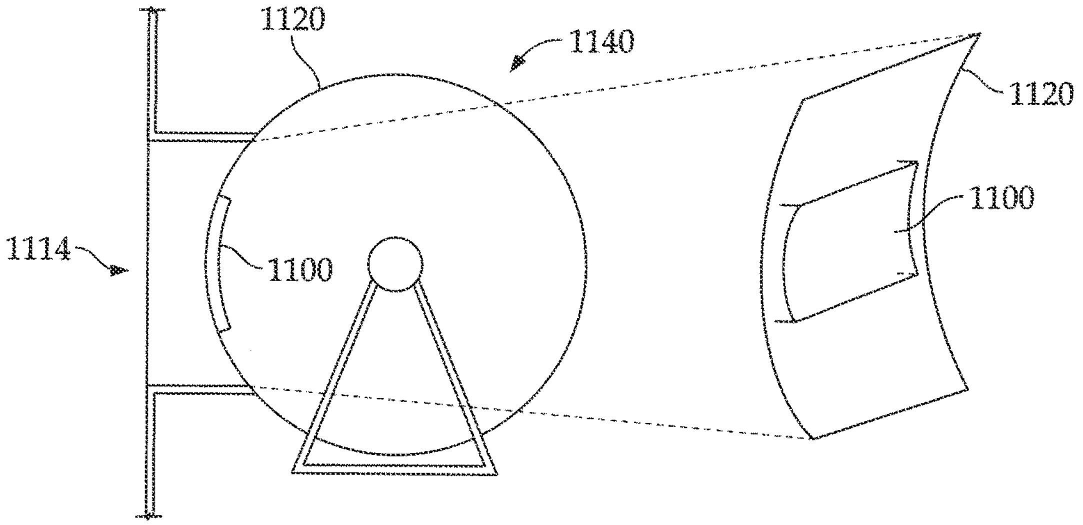
FIG. 24 is a side view and perspective view of a display region of a gaming machine in accordance with embodiments of the invention.

For certain embodiments, FIG. 24 illustrates a transparent layer 1100 or similar projection surface, mechanically secured at one or more points to a second surface, such as a reel strip or a reel frame 1120. The mechanical attachment is contemplated to include a spring-like or mechanical suspension that allows at least one degree of freedom of movement. In certain embodiments, three degrees of freedom of movement can be allowed between the transparent layer 1100 and the reel frame 1120. For example, the mechanical attachment can allow the transparent layer 1100 to move vertically (in and out) and/or horizontally (right and left and/or up and down) relative to the reel frame 1120. Mechanical suspension of the transparent layer 1100 can allow mechanical imperfections to be introduced into a gaming machine during the rotation of a mechanical structure 1140 to which a reel frame 1120 may be attached. As an image is projected onto the transparent layer 1100, wobble or other imperfections may be introduced the primary display 1114. In one alternative, a reel frame may be the same as the mechanical structure 1140.

Figure 25:
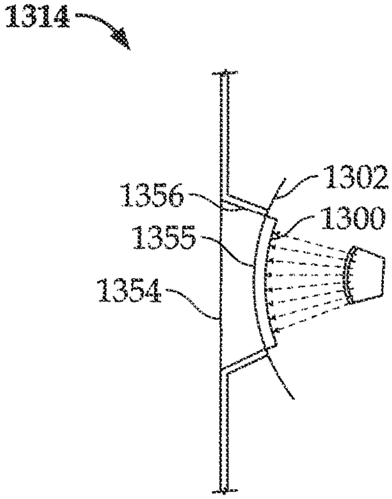
FIG. 25 is a side view of a display region of a gaming machine in accordance with another embodiment of the invention.

FIG. 25 illustrates a display window 1354 with a trapezoidally shaped viewing area 1355 that provides an angled surface 1356 to minimize blindspots in the primary display 1314. When projecting an image onto two offset surfaces such as first layer 1300 and second layer 1302, the offset can lead to blindspots or cutoff of the image projected onto the second layer relative to the image projected onto the first layer. If the surface 1356 was not angled, but instead was parallel with the center line of projection (i.e., perpendicular to display window 1354), the image would be projected onto the surface 1356 and would not be visible to a player of the gaming machine.

In certain embodiments, the simulation of visual imperfections in a reel strip or a series of reel strips can include making each reel appear to flutter or wobble independent of the other reels. For example, in a five reel gaming machine, the simulation of mechanical flutter or wobble can be implemented by using one or more video display devices and projection surface subject to any combination of the visual imperfection methods described herein. Physics simulators can also be used to simulate visual imperfections, such as simulating a harmonic motion, wobble or shimmy that can occur in a mechanical reel system. The physics simulator can then be applied to an image or series of images before the image(s) are projected onto a projection surface to include the appearance of visual imperfections in a reel strip.

In certain embodiments, projected images simulate the cocking or backlash that occurs with mechanical gaming systems and the subsequent unloading, or release, of the reels that occurs immediately before the reels begin spinning forward. In one embodiment, the cocking and unloading simulation is contemplated to give the appearance that the reels are cocked sequentially followed by a simultaneous unloading of all the reels.

Furthermore, some embodiments contemplate a gaming device player's interaction with the device as an input factor for simulating visual imperfections such as cocking and unloading of the reels. For example, the speed (e.g., slow or fast) with which a player pushes or pulls a gaming device lever (e.g., a player input device such as a joystick or pull lever) can be monitored and applied to the cocking and unloading simulation to provide a similar appearance as a slow or fast lever movement in a mechanical gaming device. In another example, the amount of effort or force (e.g., soft or hard) a player exerts in pushing or pulling a gaming device lever can be monitored to provide a similar appearance as a soft or hard lever movement in a mechanical gaming device. In certain embodiments, a gaming device lever can have a finger-type control similar to a joy-stick device. Based on the input of the player, the type of cocking motion and unloading that is simulated for the reels is determined using, for example, a physics engine or a database with a predetermined cocking motions and unloadings based on ranges of player speed and force or effort. The database can be stored in the memory 36 for the gaming machine 10.

Figure 26:
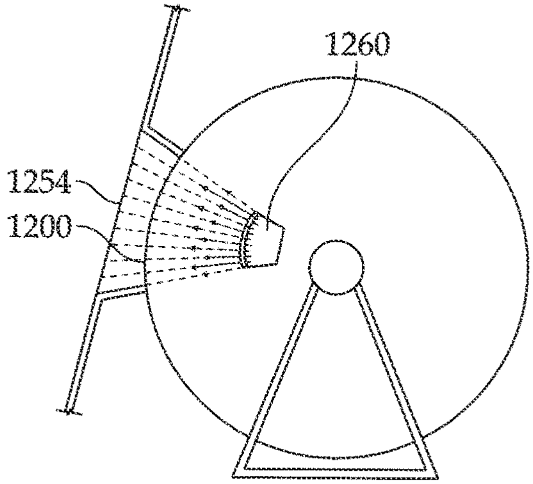
FIG. 26 is a side view of a display region of a gaming machine in accordance with yet a further embodiment of the invention.

In certain embodiments, as illustrated in FIG. 26, a 3-D effect can be obtained by projecting an image from a video display device 1260 onto a transparent surface 1200 and also onto the front glass or display window 1254 of the gaming machine. The transparent surface 1200 and the display window 1254 are contemplated to be along offset planes that may or may not be parallel to each other. The display window 1254 is further contemplated to be along the same projection path that the video display device 1260 is projecting images to the transparent surface 1200. In another embodiment, the front glass or display window can further display various meters associated with a gaming machine, such as credit meters, coin-in, bet, etc.

In other aspects, a transmissive display technology can be used in which a rear projection video display device provides a 3-D effect through the illusion of depth by providing two layers of video. The use of transmissive display technology in a gaming machine is described further in U.S. Pat. No. 7,160,187, filed Dec. 17, 2002, entitled "Gaming Machine With Superimposed Display Image", and U.S. Pat. No. 6,517,433, filed May 22, 2001, entitled "Reel Spinning Slot Machine With Superimposed Video Image". The '187 and '433 patents are each incorporated herein by reference in their entireties.

In certain embodiments, a gaming machine transitions between different games that have different reel symbols. During the transition, new images may be downloaded to the gaming device. The transition can include darkening the projected images or fading the projected images out before introducing the new reel images. The transition can occur in a number of ways including while the reels are spinning or are simulated to be spinning. In other aspects, the symbols from the old game can fade out and the new symbols can then be faded in to minimize any undesirable observations by the player of an harsh transition.

Further, the gaming machine 10' may include sound effects that replicate typical sounds in a mechanical reel system such as the hum or vibration, especially when starting or stopping. The sounds effects can also include the background hum of a machine when it is stopped and the reels are no longer spinning. The sound effects can be projected to a player using an audio system. In certain embodiments, a speaker is placed inside the gaming cabinet in an area near where mechanical reels would typically be placed. Such a speaker placement would make the sound effects of the mechanical reel spin more realistic to a player since the sound is coming from the area of the mechanical reels. Other sounds for the slot machine can be generated at a standard location on the gaming machine.

The sound effects can change as each of the video reels slows and, eventually, stops. Thus, the gaming machine 10' may broadcast a high pitch, high-volume sound effect that is typical of mechanical reels when all of the video reels are initially spinning at a high-speed condition. But, the pitch and the volume may decrease as each video reel comes to a stop. The gaming machine 10' may also have player-input device where the player has some control over the movement of one or more simulated reels (e.g., a "braking" motion). The player's input then has an effect on the sound effects as well. Further, the sound effects may be varied depending on the position of the player's head 558 as sensed by the e-field sensors in the sensors 550. For example, the sound effects may change in volume or direction depending on the position of the player's head relative to the screen. The sound effects may be optimized depending on the player's position in relation to the screen. Further, the presence of a player near the gaming machine 10' may be detected via the e-field sensors and an audio message enticing the player to play the gaming machine 10' may be broadcast in the direction of the player. For example, a message may be broadcast to prompt a player to swipe a player tracking card in the gaming machine 10.' Other reminders may be broadcast to a detected player such as not to leave the tracking device inserted in the gaming machine 10' while they are playing or to thank the player once the player leaves the area of the gaming machine 10'.

The environmental mapping of the video reel 560 as described with reference to FIGS. 19-20 and the alteration of the video reel 560 to achieve some typical imperfections as described with reference to FIG. 21 can be applied to the various video-reel embodiments disclosed in FIGS. 3-15.

On some of the embodiments (e.g., rotating electronic paper), power may be needed on the rotating reel drum or cage. In that situation, an ultra-thin, rechargeable battery that rotates with the reel drum or cage can be used. When the gaming machine 10 is idle, the rotation of the reel drum or cage could be such that it stops at a known angular position (or positions) at which a docking station permits the recharging of the ultra-thin batteries.

Another feature may be the automatic adjustment of features of the gaming machine 10' based on player location detected by the e-field sensors in the sensors 550. For example, a display may be automatically adjusted to a position relate to a player's head based on the location of the player's head.

Figure 27:
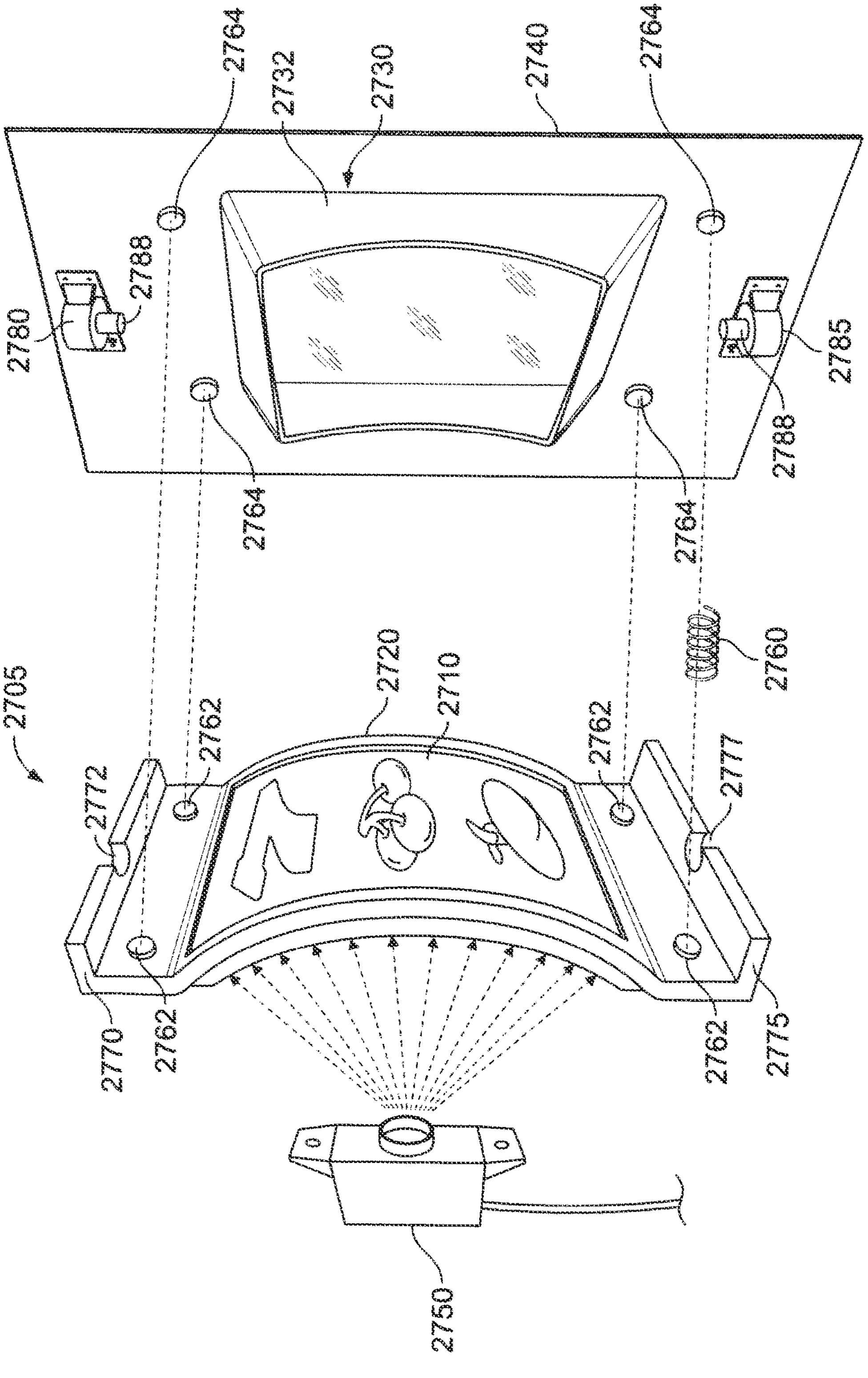
FIG. 27 illustrates a perspective view for a floating screen assembly in accordance with embodiments of the invention.

In certain embodiments, a gaming machine can include dynamic control of the physical movements in the x, y and z directions (that is, up and down, left and right, and forwards and backwards or any combinations thereof) of a screen to simulate a mechanical reel device. Dynamic control can be implemented using an electromechanical control apparatus. FIG. 27 illustrates a multi-perspective view of an articulated screen for rear projected reels. A floating screen assembly 2705 can include a screen 2710 that is mounted to a subframe 2720 which in turn can be mounted to a display area 2730 or to a housing 2740, using resilient members. The screen 2710 and subframe 2720, when viewed by a player through the display area 2730, is designed to have the appearance of a mechanical reel cage typically found on a mechanical reel device. For example, the screen 2710 and subframe 2720, when operating with a video display device 2750, has the appearance of an actual spinning reel from a mechanical slot machine reel including the sidewalls and the reel strip.

FIG. 27 illustrates a video display device 2750, such as a mini-laser projector as manufactured, for example, by Microvision, Inc. or Explay Ltd or similar devices. In addition to a mini-laser projector, other methods and types of video displays have been described herein for presenting images. Furthermore, other configurations of video display device(s) and screen(s) (e.g., projection layer(s)) have been described, as well, for simulating mechanical reels. FIG. 27 illustrates one exemplary embodiment of one video display device for presenting images onto a curved surface (for example, a screen), for the simulation of a single mechanical reel. Other configurations presented herein are applicable, as well.

The video display device 2750 in FIG. 27 can be mounted (not shown) with the projector having a generally rigid connection to the screen 2710. The generally rigid connection allows the projector to maintain video output to the screen assembly 2705 and also allows vibrations or other movements to be transmitted to both the screen assembly 2705 and the video display device 2750. The connection between the video display device 2750 and the screen assembly 2705 allows the two elements to generally move together so that the presented images move together with physical movements of the screen assembly 2705.

In certain embodiments, the subframe 2720 is semi-rigidly connected to the display area 2730 or the housing 2740. For example, coil springs 2760 can be attached to spring mounts 2762 on subframe 2720 and spring mounts 2764 on the housing 2740 to semi-rigidly mount subframe 2720 to housing 2740. Other devices capable of securing the subframe 2720 to the housing 2740 or to display area 2730, and further capable of allowing outside influences such as vibrations to be transmitted to the screen assembly 2705, are also contemplated, such as semi-rigid plastic materials. Semi-rigid mounting for subframe 2720 allows the screen assembly 2705 to attain a neutral position centered within the shroud 2732 of the display area 2730.

In certain embodiments, an actuation device mechanically connected to the subframe 2720 can be used to develop slight harmonic or cyclic motions in the screen assembly 2705. For example, a motor with an eccentric shaft can be used to apply slight harmonic motion to the subframe 2720 during the presentation of images simulating the rotation of a mechanical reel. The actuation device can further be controlled to simulate a hard stop and shimmy, similar to what can occur for an actual mechanical reel device.

In certain embodiments, the subframe 2720 has an upper flange 2770 and a lower flange 2775 extending, respectively, from upper and lower ends of the subframe 2720. The flanges 2770, 2775 can include slots 2772, 2777, which allow the subframe 2720 to be in mechanical communication with or coupled to an upper drive motor 2780 and to a lower drive motor 2785. The drive motors 2780, 2785 are mounted to either the housing 2740 (shown) or to the display area 2730 (not shown) of the gaming machine. The drive motors 2780, 2785 can be fitted with eccentric lobes 2788 on the motor shaft, or similar fittings that allow an eccentric load to be imparted to the subframe 2720. In the embodiment illustrated in FIG. 27, the eccentric lobes 2788 float within the slots 2772, 2777 and impart an eccentric load to the subframe 2720 while rotating. The rotation of the eccentric lobes 2788 places them in contact with the slots 2772, 2777 of subframe 2720.

In certain embodiments, the eccentric lobes 2788 have approximately 0.5 to 1 millimeter of eccentricity. For a system, similar to the one illustrated in FIG. 27, in which two drive motor are connected to the upper and lower flanges 2770, 2775 of the subframe 2720, the 0.5 to 1 millimeter of eccentricity translates into approximately 1 to 2 millimeters of movement for the screen assembly 2705. In certain embodiments, the drive motors 2780, 2785 are arranged to be slightly out of phase with each another to allow the movement of the screen assembly 2705 to have the appearance of a spinning plastic reel drum, similar to what may be found in a mechanical slot reel device. The out of phase movement of the screen assembly 2705 provides the appearance of an out-of-round (e.g., slight undulation in-and-out of the display area 2730) and/or an out-of-square (e.g., cyclic side-to-side movement) condition typically found in mechanical reel devices. The out of phase movement can also provide an appearance of a warped movement (e.g., irregular side-to-side movement).

In certain embodiments, movements applied to the subframe 2720 using drive motors 2780, 2785 are based on the dynamic events for a spinning reel cage, including starting, spinning and stopping. Each dynamic event has unique characteristics and resonance patterns. For example, while presenting images, an out of phase movement can be imparted to give the appearance that the screen assembly 2705 resonates along the simulated axis of rotation, similar to what occurs when a mechanical reel device is braking or coming to a stop.

Figure 28B:
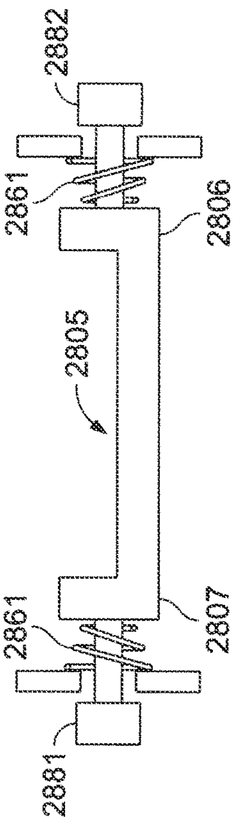
FIGS. 28A and 28B illustrate a side view and a top view of a floating screen assembly in accordance with embodiments of the invention.
Figure 28A:
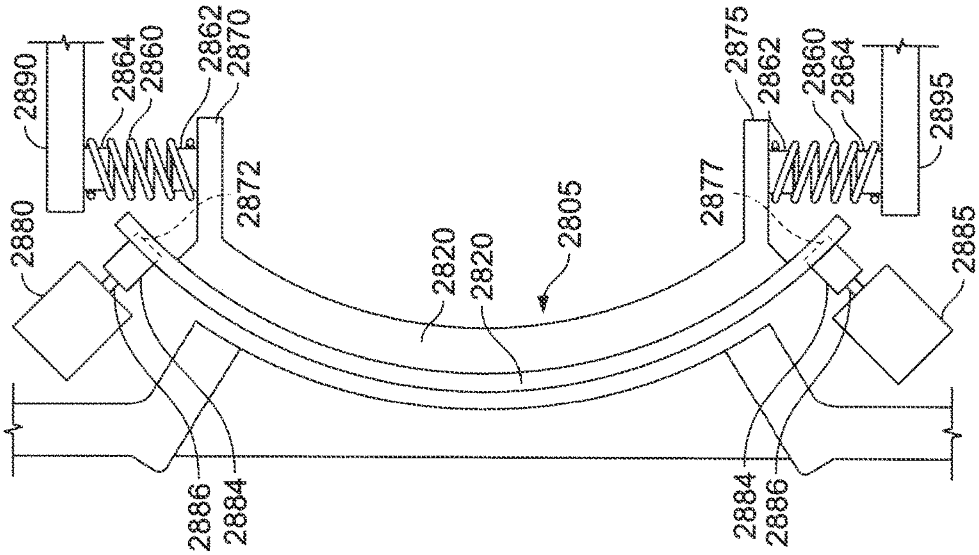

FIG. 28A illustrates an exemplary embodiment of a floating projection screen assembly 2805. The screen assembly 2805 includes a subframe 2820 that further has an upper flange 2870 and a lower flange 2875. Each flange has a spring mount 2862. A coil spring 2860 is attached to each of spring mounts 2862, and the springs 2860 are further attached to corresponding spring mounts 2864. Spring mounts 2864 are attached to an upper assembly mounting frame 2890 and a lower assembly mounting frame 2895. An upper drive motor 2880 and lower drive motor 2885 are connected or coupled to slots 2872, 2877 in the subframe 2820. The drive motors 2880, 2885 are fitted with eccentric lobes 2884 on the motor shaft 2886, or similar fittings that allow an eccentric load to be imparted to the subframe 2820.

FIG. 28B illustrates a top cross-sectional view of one alternative embodiment in which the right and left sides 2806, 2807 of screen assembly 2805 are semi-rigidly secured using coil spring(s) 2861. A left drive motor 2881 and a right drive motor 2882 can be used to impart eccentric loads to the screen assembly 2805.

Figure 29:
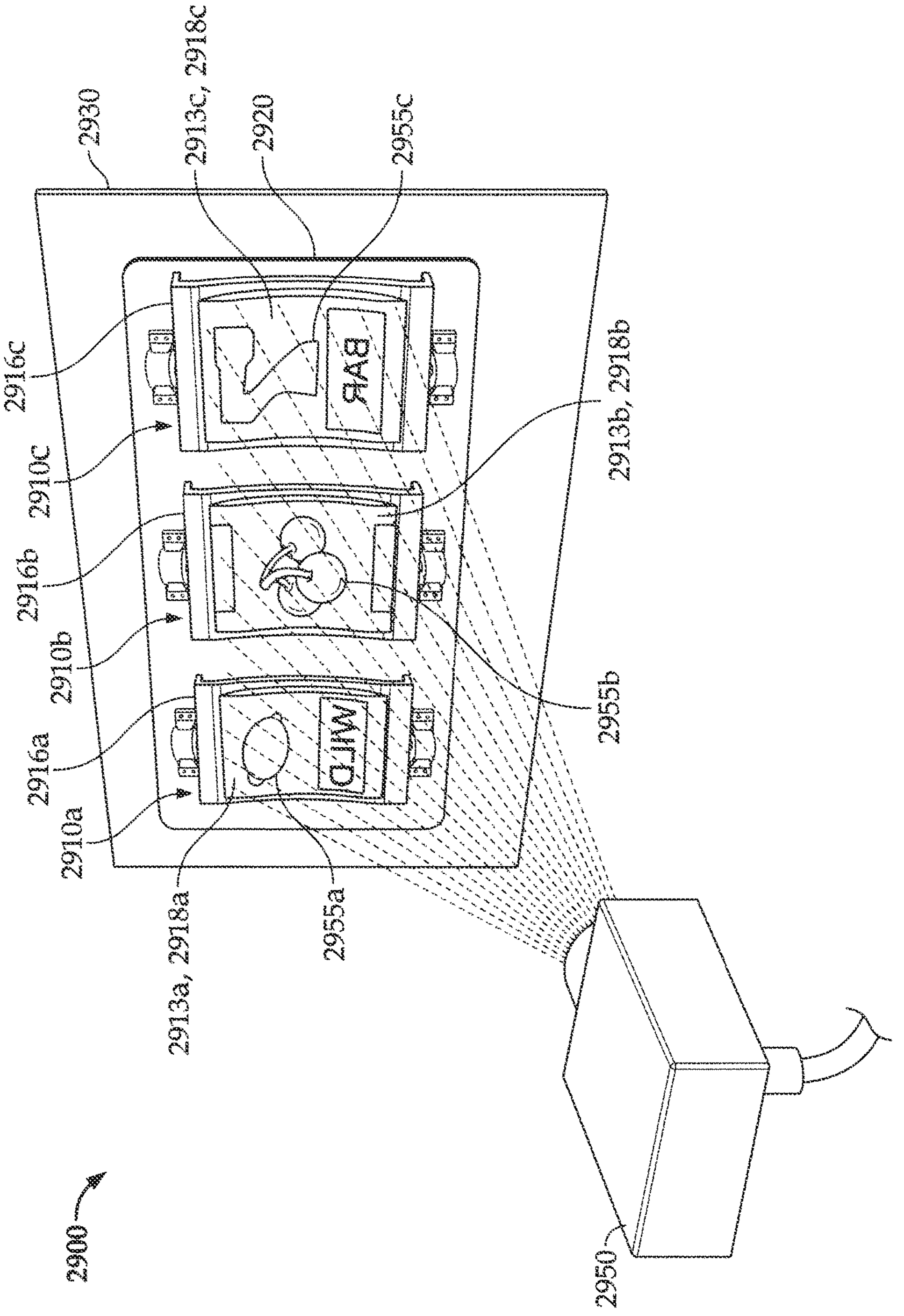
FIG. 29 illustrates a perspective view of a plurality of floating screen assemblies in accordance with embodiments of the invention.

FIG. 29 illustrates an exemplary embodiment of an articulated rear-projection floating screen assembly system within a display region 2900 of a gaming machine. The system can include multiple adjacent floating screen assemblies 2910*a-c* in which each individual assembly is similar to the exemplary embodiments illustrated in FIGS. 27 and 28. Each floating screen assembly 2910*a-c* has a projection surface 2913*a-c* that is secured to a frame 2916*a-c*. The floating screen assemblies 2910*a-c* can be mounted to a display window 2920, which in turn, can be mounted to a housing 2930 of the gaming machine. In one alternative, the floating assemblies 2910*a-c* can be mounted directly to the housing 2930 of the gaming machine.

FIG. 29 further illustrates a video projector 2950 for projecting images onto the projection surfaces 2913*a-c*. The video projector 2950 can be coupled to a controller that includes, for example, a video source that includes a program for generating the output images projected by the video projector 2950. The illustrated embodiment shows the video projector 2950 displaying images of symbols 2955*a-c* onto the projection surfaces 2913*a-c*. The symbols 2955*a-c* can be of the type generally found on a slots game (e.g., WILD, lemon, cherry, BAR, number 7, etc.). The video projector 2950 can also display images that simulate the mechanical reels of a slots machine as discussed previously. For example, the video projector 2950 can project images that include imperfections associated with a mechanical reel such as an imperfect edge, a flaw in a symbol, shadowing, a jitter, a wobble, etc. The floating screen assemblies 2910*a-c*, when operating together with a video projector 2950, have the appearance of spinning reels that include the sidewalls and the reel strip expected to be found on a mechanical slots game.

The video projector 2950 illustrated in FIG. 29 projects a single output of a main image area that includes three independent display regions or subareas 2918*a-c*. The subareas 2918*a-c* are projected onto the three projection surfaces 2913*a-c*. For example, the main image output from the video projector 2950 includes the subarea 2918*a* which is projected onto projection surface 2913*a*. The main image output also includes the subareas 2918*b, c* which are projected onto projection surface 2913*b, c*, respectively. The subareas 2918*a-c* can include images of symbols or other representations for simulating a mechanical reels. Similar to a slots game, the symbols from all or a portion of the subareas 2918*a-c* can be used to select an outcome of the wagering game.

The video projector 2950 can have a high-definition (HD) type of output that includes high brightness levels. The image output from the video projector 2950 is generally sized based on the size and layout of the projection surfaces 2913*a-c* of the floating screen assemblies 2910*a-c* and the distance between the video projector 2950 and projection surfaces 2913*a-c*. In one embodiment, the video projector 2950 can display an image having approximately a 15-inch diagonal that contains subareas 2918*a-c* which depict the individual reels of the slots game.

The embodiment illustrated in FIG. 29 can include dynamic control of the physical movements in the x, y and z directions (that is, up and down, left and right, and forwards and backwards or any combinations thereof) of the floating screen assemblies 2910*a-c* to simulate mechanical reels. In certain embodiments, the x and y directions (that is, up and down and left and right) can also be controlled for each of subareas 2918*a-c* within the main image area projected by video projector 2950. In one embodiment, the subareas 2918*a-c* can move six pixels in any one of the x and y directions within the main image area. In certain embodiments, the subareas 2918*a-c* can move from approximately 1 millimeter to 2 millimeters in any one of the x and y directions within the main image area. In some embodiments, the subareas 2918*a-c* can move up to 2 millimeters in any one of the x and y directions within the main image area. In certain embodiments, the movement of a subarea 2918 in the x and/or y direction is synchronized to the movements in the same x and/or y direction of the corresponding floating screen assembly 2910. The movement between adjacent floating screen assemblies can be coordinated to simulate imperfections between adjacent mechanical reels in a slots game.

The movement of one of subareas 2918*a-c* projected onto the corresponding projection surfaces 2913*a-c* is synchronous with and in the same x and/or y direction and over the same x and/or y distance as the corresponding floating screen assembly 2910. Thus, while a subarea 2918*a-c* may be moving within the main image area, the images projected onto a projection surface 2913*a-c* should not appear to a player to be moving relative to the respective one of floating screen assemblies 2910*a-c*. The subareas 2918*a-c* of images projected onto the projection surface 2913*a-c* along with the movements of the floating screen assembly 2910*a-c* can then give the appearance of a mechanical reel used in a slots game.

The synchronized movements between subareas 2918*a-c* and the floating screen assemblies 2910*a-c* can be achieved in different ways. For example, a floating screen assembly 2910 can be provided with a position detector (not shown). The position detector for each floating screen assembly 2910*a-c* can be synchronized and coordinated using the controller so that the subareas 2918*a-c* correspondingly move so that the images displayed on each projection surface 2913*a-c* do not appear to be moving relative to the movement of each floating screen assembly 2910*a-c*.

In certain embodiments, an actuation device mechanically connected to the frame 2916*a-c* can be used to develop slight harmonic or cyclic physical movements in the floating screen assemblies 2910*a-c*. For example, a motor with an eccentric shaft can be used to apply slight harmonic motion to a frame 2916 during the presentation of images simulating the rotation of a mechanical reel. The actuation device can further be controlled to simulate a hard stop and shimmy, similar to what can occur for an actual mechanical reel device. The implementation of such physical movements can be applied in the embodiments illustrated in FIG. 29, as described previously, for example, for FIGS. 27-28.

The movements applied to the frames 2916*a-c* are based on dynamic events for a spinning reel cage, including starting, spinning and stopping. Each dynamic event has unique characteristics and resonance patterns. For example, while presenting images, an out of phase movement can be imparted to give the appearance that the floating screen assembly 2910 resonates along the simulated axis of rotation, similar to what occurs when a mechanical reel device is braking or coming to a stop. In one embodiment, movement of the floating screen assembly can be initiated based on specific commands from a controller to a motor coupled to a frame 2916 for a floating screen assembly 2910.

While the illustrated embodiment in FIG. 29 has three floating screen assemblies 2910*a-c*, fewer or additional assemblies can be used depending on the wagering game. For example, in certain embodiments, five floating screen assemblies are used. In certain embodiments, multiple video projectors and/or displays with multiple floating screen assemblies and/or displays can also be used.

Figure 30:
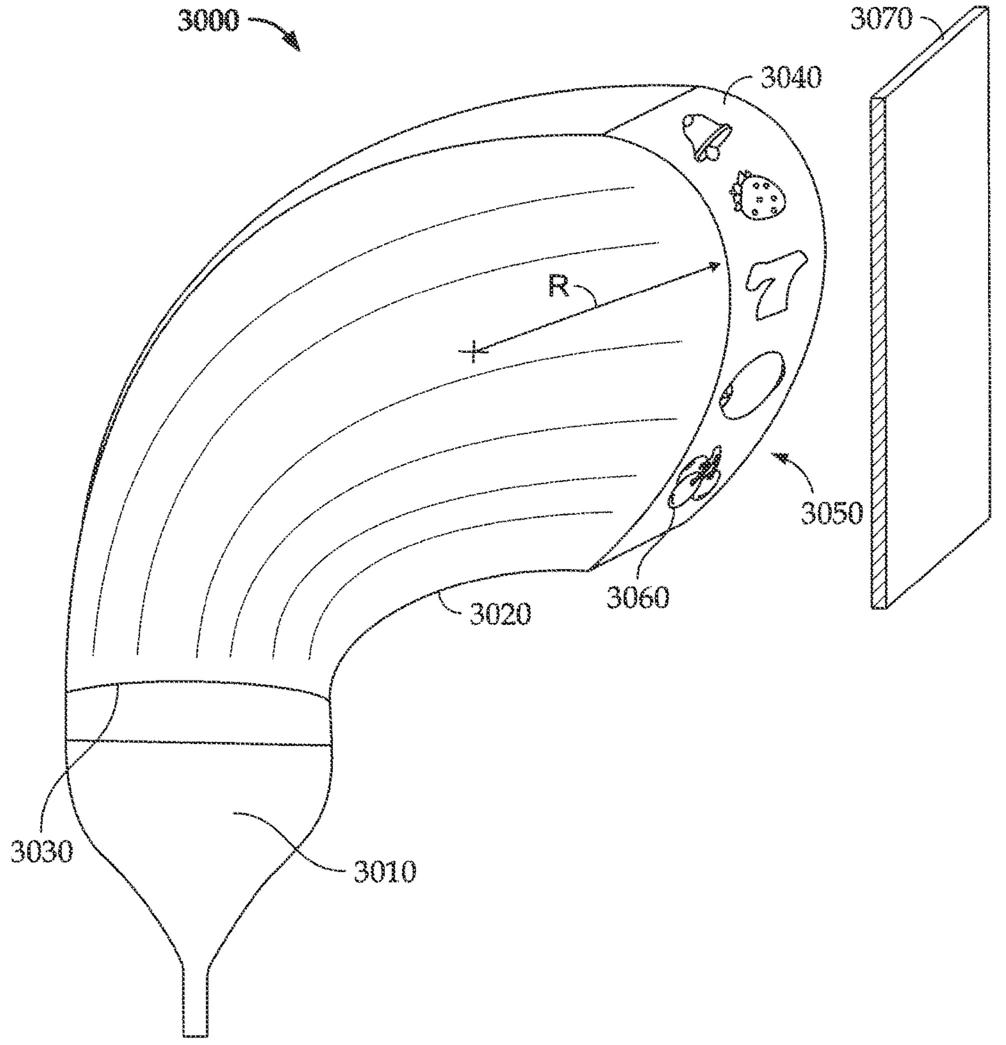
FIG. 30 illustrates an isometric view of one embodiment of the invention having an image display overlying a simulated mechanical reel produced by optical fibers having ends on a locus in which the radius of curvature is similar to that of a typical mechanical reel.

Turn now to FIG. 30, a simulated reel system 3000 is illustrated having a video or image display device 3010 that provides output, such as video images, into a fiber optic bundle 3020 (e.g., a light pipe or an image conduit) that comprises a plurality of optical fibers. The fiber optic bundle 3020 has a first end 3030 that is located adjacent to the display device 3010 and is optically coupled thereto. This optical coupling can be brought about by ensuring close proximity between the first end 3030 of the fiber optic bundle 3020 and the display device 3010 through the use of an optically transparent adhesive. The display device 3010 may be one of a variety of devices including a CRT display, liquid crystal display (LCD), dot matrix, vacuum fluorescence display, organic light emitting diode (OLED), LED array, etc. The simulate reel system 3000 may be included as part of a display region for a gaming machine, such as, for example, the display regions illustrated in FIG. 1, 3-8, 15, 16, 25, 26 or 29.

A second end 3040 of the fiber optic bundle 3020 is located on a curved surface or plane having a radius R that approximates the curvature of a typical mechanical reel. The radius is generally in the range of from about 4 to about 7 inches. Thus, the second end 3040 provides video images that simulate a mechanical reel 3050 through the display of a plurality of symbols 3060. Each of the symbols 3060 is produced by the display device 3010 which, in response to a wager input from a player, causes the apparent movement of the simulated reel 3050 behind a display window or front glass that isolates the reel from the player. The display window may also include the artwork that provides additional aesthetics to the gaming machine. The apparent movement of the simulated reel 3050 is caused by movement of the symbols 3060 across the second end 3040 of the fiber optic bundle 3020.

A simulated reel system can be incorporated into a gaming machine or gaming terminal that is connected to a server-based network. The gaming machine or gaming terminal can be made to look like a mechanical slot machine. For example, a gaming machine simulating a mechanical slots game would be made to look like it has curved reels behind a flat piece of glass or a display window.

FIG. 30 further illustrates a second image display device 3070 for displaying images that are spatially separated from the images displayed on the curved surface of the second end 3040, which simulates a mechanical reel. The images displayed by the second display device 3070 can include indicia of the wagering game. Furthermore, it is desirable that the second display device 3070 allows for the video images displayed on the curved surface of the second end 3040 to be partially visible through the images displayed on the second image display 3070. This can be accomplished, for example, by using a transmissive display for the second image display 3070. In certain embodiments, the second image display 3070 is a flat-panel, transmissive display that may be an LCD. The image display 3070 (e.g., virtual image display), shown in FIG. 30, is a vertically-oriented, flat, off-set plane positioned a short distance away from the second end 3040 of the fiber optic bundle 3020. The display 3070 can comprise a transmissive LCD video display or other projection arrangement, such as disclosed, for example, in International Patent Publication No. WO2007/005846, published on Jan. 11, 2007, entitled "Wagering Game with Overlying Transmissive Display for Providing Enhanced Game Features".

In other embodiments, video images may be virtual images displayed on a vertical plane in front and off-set from the curved surface of the second end 3040. For example, a video display such as video display device 610 (e.g., a video projector) shown in FIG. 5D can project video images onto a display window 654 or a plane parallel to the window 654 rather than onto a projection surface 700. In certain embodiments, a partially reflective mirror can overlay the curved surface of the second end 3040 that creates the simulated mechanical reel. Thus, the second image display device projecting images onto the partially reflective surface does not necessarily need to be positioned in front of the curved surface of the second end 3040 in order for a virtual image to be displayed in front of the images portrayed on the second end 3040 in FIG. 30. Examples of superimposing a video image are also illustrated, for example, in U.S. Pat. No. 6,517,433, issued on Feb. 11, 2003, entitled "Reel Spinning Slot Machine With Superimposed Video Image", which is incorporated herein by reference in its entirety.

FIG. 30 illustrates one system for simulating a mechanical reel. Other embodiments for providing a simulated mechanical reel are previously disclosed herein and are also disclosed, for example, in U.S. Patent Application Publication No. 2003/0157980, published on Aug. 21, 2003, entitled "Simulation of Mechanical Reels on a Gaming Machine"; U.S. Patent Application Publication No. 2006/0135248, published on Jun. 22, 2006, entitled "Gaming Machine Having Electrophoretic Displays and Method Thereof"; U.S. Patent Application No. 60/959,130, filed on Jul. 11, 2007, entitled "Wagering Game Having Display Arrangement Formed by an Image Conduit"; U.S. Patent Application Publication No. 2004/0266515, published Dec. 30, 2004, entitled "Gaming Machine with Reel Strips Having an Organic Light Emitting Diode Display"; and U.S. Patent Application Publication No. 2005/0140088, published Jun. 30, 2005, entitled "Entertainment Machines", each of which is incorporated herein by reference in their entireties.

The display device 3010 and the second image display 3070 can be controlled individually and/or in combination to produce enhancements to symbols 3060, provide new symbols or provide other information to enhance the experience of the player. In addition to symbols, information associated with a gaming machine, such as credit meters, coin-in, bet, etc. can be provided to a player on the second image display 3070 or on the second surface 3040.

Figure 31:
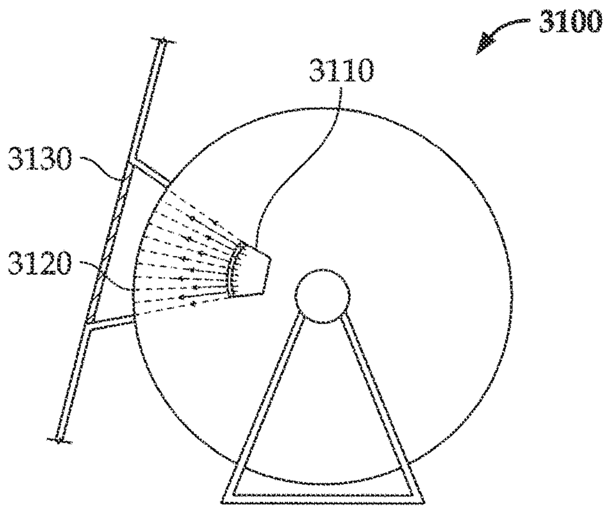
FIG. 31 illustrates a side view of a display region of a simulated mechanical reel with an overlying image display in accordance with one embodiment of the invention.

Turn now to FIG. 31, a simulated reel 3100 is illustrated having an image display 3110 that projects an image onto a movable curved surface 3120, similar to the embodiment illustrated in FIG. 26. A flat, second display surface 3130, similar to the transmissive display 3070 in FIG. 30 is also shown. By using transmissive display technology, two layers of video are provided that can be individually controlled. The two layers of video can include two different sets of images for which a first one projects onto the curved surface 3120 to simulate a mechanical reel. The second set of images on the transmissive display surface 3130 may enhance the underlying symbols on the curved surface 3120. For example, the two video sets may include images of the same symbols in the same order, but there may be a slight phase shift or increase or decrease in size of the images of the symbols. In certain embodiments, various imperfections found on mechanical reels for mechanical reel slot machine can be incorporated into the movable curved surface 3120.

Figure 32:
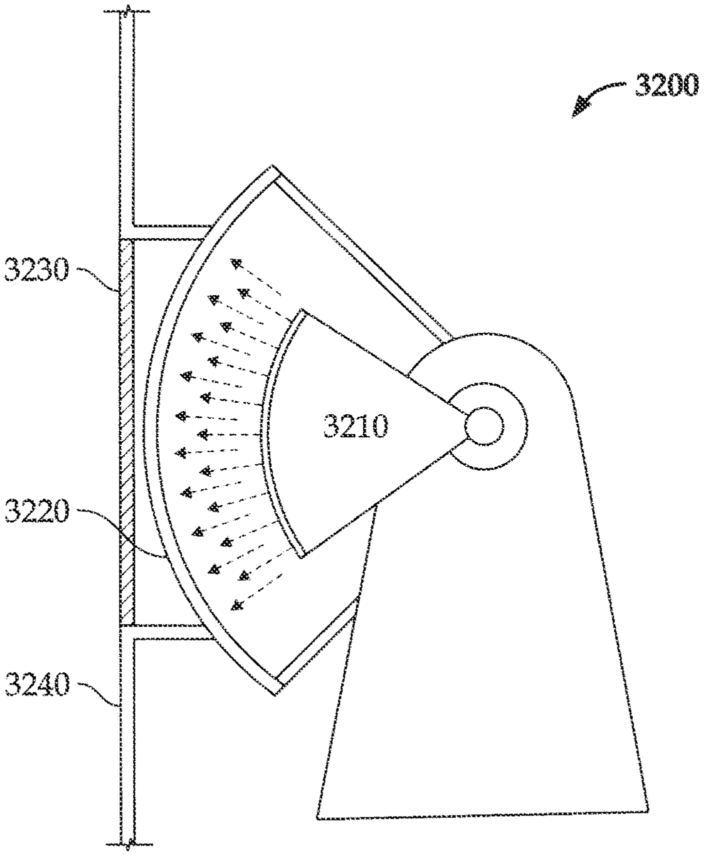
FIGS. 32-34 illustrate side views of display regions of simulated mechanical reels with overlying image displays in accordance with certain embodiments of the invention.

FIG. 32 illustrates an embodiment of a simulated mechanical reel 3200 having a display device 3210 that projects images of, for example, symbols onto a curved projection surface 3220 that may be attached to the housing 3240 of the gaming machine. The curved surface 3220 has a radius of curvature that is similar to the radius of curvature of a mechanical reel used within a mechanical-reel style of gaming machine (e.g., four inches to seven inches). The curved surface 3220 can be transparent or semi-transparent for only certain wavelengths of light, such as various polymeric materials. In certain embodiments, the curved surface may be a translucent material. The second display surface 3230 can be a transmissive display or it can receive projected images from a projection device. In certain embodiments, the display surface 3230 can be a flat surface spatially separated from the curved surface 3220. The display surface 3230 can be attached to the housing 3240 of the gaming machine. The curved surface 3220 and the display surface 3230 can include dynamic images that move in a manner that is similar to the movement of symbols on a mechanical reel. Accordingly, the images on the curved surface 3220 include a plurality of symbols used for indicating the randomly selected outcome of the wagering game. From the player's perspective, the images on the curved surface 3220 appear to be symbols rotating on a mechanical reel.

In certain embodiments, a common projection device, such as a video projection device shown in FIGS. 31-32, can be used to project symbols onto the curved projection surface 3120, 3220 and onto the second display surface 3130, 3230. In other embodiments, two projection devices or a combination of image display devices can be used to display images onto the display surfaces.

Figure 33:
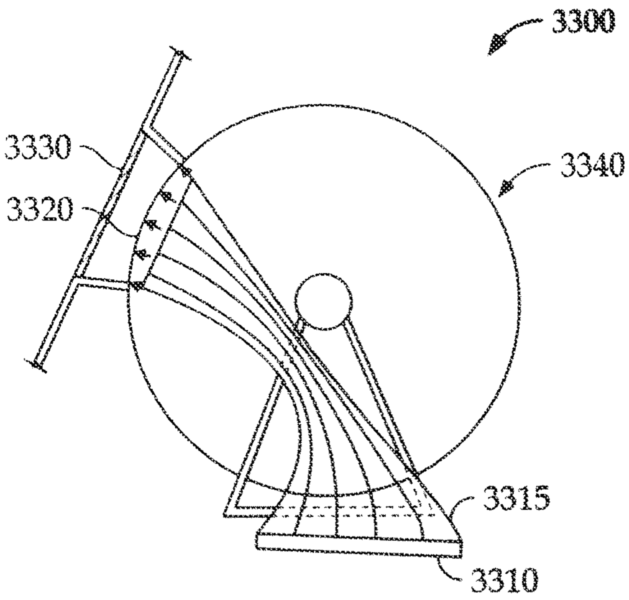
Figure 34:
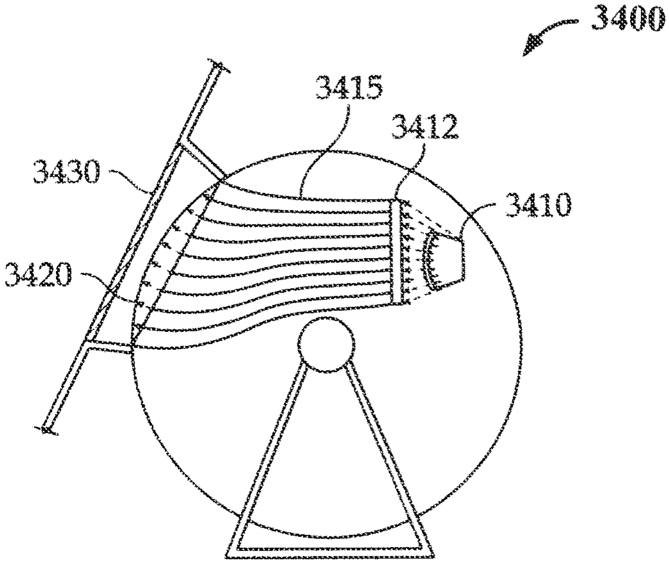

FIGS. 33 and 34 illustrate simulated reel systems 3300, 3400 having a second image display 3330, 3430. Unlike the embodiments of FIGS. 31-32, which project the images to the curved surface through air, a solid medium, such as, fiber optics, light piping or image conduits, can be used to project an image from a video display 3310, 3410 onto a projection surface 3320, 3420. In the embodiment illustrated in FIG. 33, the video display 3310 is a flat element that is coupled to fiber optic bundles 3315. A rotatable structure 3340 includes a curved projection surface 3320.

In the embodiment illustrated in FIG. 34, a video display device 3410 can project an image onto a transparent layer 3412. An image conduit 3415 on the opposite side of the transparent layer 3412 can then carry images onto projection surface 3420 for viewing by a player. The displays 3330, 3430, in FIGS. 33 and 34, are similar to the displays 3070, 3130, 3230 illustrated in FIGS. 30-32 and are also spatially separated from the surfaces used to provide the simulation of a mechanical reel.

In certain embodiments, the image conduit provides a curved surface, as is disclosed in U.S. Patent Application No. 60/959,130, filed on Jul. 11, 2007, entitled "Wagering Game Having Display Arrangement Formed by an Image Conduit", which was previously incorporated herein by reference in its entirety.

Simulated mechanical reels in the embodiment disclosed herein can be programmable reels strips having images and other information installed through a new memory placed into the gaming machine. In gaming terminal embodiments, the programmable reel strips can have images and other information downloaded to the terminal from a server-based gaming network.

For the embodiments described above, the images that are projected or displayed onto the display surfaces are stored as data files of a memory device. The memory device may also include different game assets, such as game software, sounds, math (e.g., probability distribution tables, pay tables, etc.), and art (e.g., reel strip and virtual image display information). For a gaming system or a gaming network that allows downloads to the gaming machines or gaming terminals, different types of game assets can be downloaded so as to alter the images that are projected or displayed using the various video display devices, the various virtual image displays, and virtual reel surfaces disclosed herein.

The image data can be downloaded as new game assets from a game asset repository. The game asset repository can include remote sources, such as a remote server in a server-based gaming system. For example, a game asset repository may be centrally located within a casino or on a server monitored by the casino operator. The repository may also be monitored by the gaming machine manufacturer or it may be accessible over the Internet at a specified Internet address. By using a server-based gaming system, it can be quicker and easier to switch between games by downloading new software and game assets for a new game to individual gaming terminals or gaming machines. Hence, the games can be changed frequently and game changes can be made more cost-effectively without requiring a physical change of the gaming machine hardware.

In certain embodiments, a mechanical reel can be simulated by projecting onto a non-spinning curved screen a video recording of all or a portion of an actual spinning mechanical reel(s). For example, a rear projection configuration, such as the one illustrated in FIG. 3, can be used in which a projection surface or screen (e.g, transparent layer 150) has a radius of curvature similar to the radius of curvature of a mechanical reel. A projection device can be used to project the video onto the curved projection surface. The projection surface can be a single screen onto which a single projection device can be used to display multiple simulated mechanical reels. A single projection device or multiple projection devices can also be used to project video(s) onto multiple screens to represent the reels of a mechanical slots game. In certain embodiments, video recordings of three or five mechanical reels in various modes, including cocking, releasing, spinning forward and stopping, can be projected onto a single screen. The different modes can include various amounts of wobble, forward spinning, back spinning, or side-to-side movement that would be expected from the various modes of mechanical reel operation.

The projection of the video of mechanical reels spinning can be initiated by a player pressing an input device. The projected video then displays the spinning of the reels for either a predetermined period or until the player presses an input device to stop projection of spinning mechanical reels. In one embodiment, the video of the mechanical reels can be recorded in a high-definition format and include portions of the background of the gaming cabinet used for recording the various modes of mechanical reel operation. In another embodiment, a portion of the video of the mechanical reels operation modes is projected onto the projection surface. For example, the two vertical edges of each mechanical reel and the area between the vertical edges of adjacent mechanical reels can be projected onto the projection surface. In one embodiment, the video recorded for a mechanical reel can have a total width of approximately 4 inches with a left vertical edge subarea less than 0.25 inches wide, a middle symbol subarea that is 3.5 inches wide and a right vertical edge subarea less than 0.25 inches wide. The middle symbol subarea can be replaced with a blue-screen, that is, a monochromatic background that can be replaced with a different image. Artistic renditions of symbols that are randomly generated by a computer can then replace the blue-screen in the middle symbol subarea. In one embodiment, rather than creating a blue-screen, the middle symbol subarea from a video of mechanical reel(s) can be overplayed with computer-generated symbols. In another embodiment, a video of a mechanical reel(s) can be recorded in which the reel strips are blank, that is, without symbols. The artistic rendering of computer-generated symbols can then be superimposed onto the area typically occupied by symbols and projected onto the screen along with the video of the mechanical reel.

In certain embodiments, a gaming machine for playing a wagering game is contemplated that includes a housing having a display region, a rotatable layer in the shape of a cylinder, a symbol development station located adjacent to the rotatable layer, and a symbol removal station located adjacent to the rotatable layer. The rotatable layer can be made of electronic paper and rotate through the display region. The symbol development station can electronically interact with the rotatable layer to cause symbols to appear on the layer. The symbol removal station can electronically interact with the rotatable layer to cause symbols to disappear from the layer. The symbol development station can further be located prior to the display region in the direction of movement of the rotatable layer, and the symbol removal station can be located after the display region in the direction of movement of the rotatable layer. The symbol development station can also create a set of symbols that are used for a plurality of wagering game sessions without being removed by the symbol removal station. The symbol development station can create symbols on each revolution of the electronic paper and the symbol removal station can remove the symbols. The symbol removal station can remove symbols on each revolution of the electronic paper.

In certain embodiments, a gaming machine for playing a wagering game is contemplated that includes a housing having a display region, a controller for conducting the wagering game, a video display coupled to the controller, and an audio system for broadcasting simulated reel sounds associated with movement of mechanical reels. The video display can simulate mechanical reels of a slot machine in the display region and display images of a plurality of symbols that indicate a randomly selected outcome of the wagering game. The plurality of symbols can undergo movement through the display region. The simulated reel sounds can be coordinated with the movement of the plurality of images through the display region. The simulated reel sounds can include a first decreasing sound level associated with the stopping of one of the simulated mechanical reels and a second decreasing sound level associated with the stopping of a second one of the simulated mechanical reels. The simulated reel sounds can also include an increasing sound level associated with increasing movement of mechanical reels. The gaming machine can further include a reel-input device in which a player has control over a movement of one of the simulated reels. Simulated reel sounds can also be altered in response to an input to the reel-input device. One of the simulated reels can be displayed with a slower movement in response to the input. The gaming machine can also include a position sensor to indicate the position of a player. The sound level of the simulated reel sounds can change based on the position of a player.

In certain embodiments, a gaming machine is contemplated that includes a housing having a display region and a mechanical device for moving symbols through the display region. The mechanical device can include a first reel strip length having a first group of permanently affixed symbols for playing a first game and a second reel strip length having a second group of permanently affixed symbols for playing a second game. The second reel strip length may not being visible during the first game as the first reel strip length moves through the display region. The mechanical device can also include an outer circumference on which the first reel strip is located. The mechanical device can rotate to move the symbols through the display region. The second reel strip can be located within the outer circumference. The mechanical device can further include a roll within the outer circumference with a second reel strip length positioned around the roll. The mechanical device can also include a plurality of rolls within the outer circumference around which multiple reel strip lengths are positioned. The mechanical device can also include a motor for removing the first reel strip length from the outer circumference and advancing the second reel strip length to the outer circumference. The first game can be a basic game and the second game can be a bonus game. The first reel strip length may not be connected to the second reel strip length. The mechanical device can also include a plurality of cassettes for carrying reel strips. The first reel strip length can be located on a first one of the cassettes and a second reel strip length can be located on a second one of the cassettes. The mechanical device can be capable of moving each of the plurality of cassettes into the display region. The cassette associated with the first reel strip length can move the symbols through the display region while the cassette associated with the second reel strip length remains idle.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A casino gaming machine primarily used for playing at least one casino wagering game, comprising:
- a housing having a display region;
- one or more electronic input devices configured to receive physical input from a player to initiate the wagering game and transform the input into an electronic data signal;
- at least one electronic video display coupled to the housing in the display region; and
- one or more controllers disposed within the housing and coupled to the at least one electronic video display, the one or more controllers including a random element generator configured to generate one or more random elements, the one or more controllers configured to:
  - detect, via at least one of the one or more electronic input devices, a physical item associated with a monetary value that establishes a credit balance;
  - initiate the casino wagering game in response the electronic data signal from the one or more electronic input devices and in response to input indicative of a wager cover by the credit balance;
  - display simulated mechanical reels of a slot machine on the at least one electronic video display in the display region, the simulated mechanical reels including images of a plurality of symbols that indicate an outcome of the casino wagering game, each of the simulated mechanical reels including side edges that, from a viewing perspective of the player, are curved in a manner similar to a mechanical reel, wherein at least one of the simulated mechanical reels includes a plurality of imperfections similar to a mechanical reel, the plurality of imperfections including (i) a simulated wobble of the side edges during a simulated rotation of the at least one simulated mechanical reel and (ii) a simulated seam extending across the at least one simulated mechanical reel;

display the simulated rotation of the simulated mechanical reels on the at least one electronic video display, the simulated rotation including the simulated wobble of the side edges of the at least one simulated mechanical reel;

determine the outcome of the casino wagering game based, at least in part, on the one or more random elements;

after the display of the simulated rotation of the simulated reels, display the outcome of the casino wagering game on the at least one electronic video display;

credit the credit balance with an award received in response to the outcome being a winning outcome; and receive, via at least one of the one or more electronic input devices, a cashout input that initiates a payout from the credit balance.

2. The gaming machine of claim 1, wherein the plurality of imperfections further includes a simulated texture of material used for a mechanical reel.

3. The gaming machine of claim 1, wherein the simulated rotation of the simulated mechanical reels provides a simulated motion blur to the images of the plurality of symbols.

4. The gaming machine of claim 1, wherein the simulated mechanical reels are rendered using a real-time 3-D engine.

5. The gaming machine of claim 1, further including a transparent window located in front of the at least one electronic video display in the display region.

6. The gaming machine of claim 5, wherein the window is coupled to at least one display device for displaying other information about the casino wagering game.

7. The gaming machine of claim 6, wherein the one or more electronic input devices include a touch screen over the display region.

8. The gaming machine of claim 1, further including at least one display device for displaying other information about the casino wagering game, the at least one display device being located in front of the at least one electronic video display in the display region.

9. The gaming machine of claim 8, wherein the at least one display device is coupled to a transparent window.

10. The gaming machine of claim 8, wherein the at least one display device is a transmissive LCD display.

11. The gaming machine of claim 8, wherein the one or more electronic input devices include a touch screen over the display region.

12. The gaming machine of claim 1, wherein the at least one electronic video display includes a plurality of video displays.

13. The gaming machine of claim 12, wherein each of the plurality of video displays is used for a respective one of the simulated mechanical reels.

14. A casino gaming machine primarily used for playing at least one casino wagering game, comprising:

a housing having a display region;

one or more electronic input devices configured to receive physical input from a player to initiate the wagering game and transform the input into an electronic data signal;

at least one electronic video display coupled to the housing in the display region; and one or more controllers disposed within the housing and coupled to the at least one electronic video display, the one or more controllers including a random element generator configured to generate one or more random elements, the one or more controllers configured to:

detect, via at least one of the one or more electronic input devices, a physical item associated with a monetary value that establishes a credit balance;

initiate the casino wagering game in response to the electronic data signal from the one or more electronic input devices and in response to input indicative of a wager cover by the credit balance;

display simulated mechanical reels of a slot machine on the at least one electronic video display in the display region, the simulated mechanical reels including images of a plurality of symbols that indicate an outcome of the casino wagering game, each of the simulated mechanical reels including side edges that, from a viewing perspective of the player, are curved in a manner similar to a mechanical reel, each of the simulated mechanical reels including shaded regions and providing a simulated motion blur to the images of a plurality of symbols during a simulated rotation of the simulated mechanical reels, wherein at least one of the simulated mechanical reels includes at least one imperfection similar to a mechanical reel, the at least one imperfection including a simulated wobble of the side edges during the simulated rotation of the at least one simulated mechanical reel;

display the simulated rotation of the simulated mechanical reels on the at least one electronic video display, the simulated rotation including the simulated wobble of the side edges of the at least one simulated mechanical reel;

determine the outcome of the casino wagering game based, at least in part, on the one or more random elements;

after the display of the simulated rotation of the simulated reels, display the outcome of the casino wagering game on the at least one electronic video display;

credit the credit balance with an award received in response to the outcome being a winning outcome; and receive, via at least one of the one or more electronic input devices, a cashout input that initiates a payout from the credit balance.

15. The gaming machine of claim 14, wherein the at least one imperfection further includes a simulated seam extending across the at least one simulated mechanical reel.

16. The gaming machine of claim 14, wherein the simulated mechanical reels are rendered using a real-time 3-D engine.

17. The gaming machine of claim 14, further including at least one display device for displaying other information about the casino wagering game, the at least one display device being located in front of the at least one electronic video display in the display region.

18. The gaming machine of claim 17, wherein the at least one display device is coupled to a window in the display region.

19. The gaming machine of claim 17, wherein the at least one display device is a transmissive LCD display.

20. A casino gaming machine primarily used for playing at least one casino wagering game, comprising:

a housing having a primary display region;

a touchscreen input device within the primary display region, the touchscreen input device configured to receive a physical input from a player to initiate the casino wagering game and transform the input into an electronic data signal;

at least one electronic video display located within the housing at the primary display region;

a transparent window in front of the at least one electronic video display within the primary display region and having at least a display device associated therewith, the display device displaying other information about the wagering game; and one or more controllers disposed within the housing and coupled to the at least one electronic video display, the one or more controllers including a random element generator configured to generate one or more random elements, the one or more controllers configured to:

detect, via a value input device, a physical item associated with a monetary value that establishes a credit balance;

initiate the casino wagering game in response to the electronic data signal from the touchscreen input device and in response to input indicative of a wager cover by the credit balance;

display simulated mechanical reels of a slot machine on the at least one electronic video display in the primary display region, the simulated mechanical reels including images of a plurality of symbols that indicate an outcome of the casino wagering game, each of the simulated mechanical reels including side edges that, from a viewing perspective of the player, are curved in a manner similar to a mechanical reel, at least one of the simulated mechanical reels includes at least one imperfection similar to a mechanical reel, the at least one imperfection including a simulated wobble of the side edges during a simulated rotation of the at least one simulated mechanical reel;

display the simulated rotation of the simulated mechanical reels on the at least one electronic video display, the simulated rotation including the simulated wobble of the side edges of the at least one simulated mechanical reel;

determine the outcome of the casino wagering game based, at least in part, on the one or more random elements;

after the display of the simulated rotation of the simulated reels, display the outcome of the casino wagering game on the at least one electronic video display;

credit the credit balance with an award received in response to the outcome being a winning outcome; and receive, via the touchscreen input device, a cashout input that initiates a payout from the credit balance.

21. The gaming machine of claim 20, wherein images of the simulated mechanical reels are at least partially generated using a physics simulator.

22. The gaming machine of claim 20, wherein the at least one electronic video display is multiple displays, the multiple displays displaying the simulated mechanical reels.

23. The gaming machine of claim 20, wherein the display device associated with the transparent window displays numerical information.

24. The gaming machine of claim 23, wherein the numerical information relates to the wager from the player.

25. The gaming machine of claim 24, wherein the numerical information relates to the total amount being wagered.

26. The gaming machine of claim 20, wherein the display device is coupled to the transparent window.

27. The gaming machine of claim 20, wherein the display device is a transmissive LCD display.

28. The gaming machine of claim 20, wherein the at least one imperfection further includes a simulated seam extending across the at least one simulated mechanical reel.

29. The gaming machine of claim 28, wherein the at least one imperfection further includes a simulated texture of material used for a mechanical reel.

30. The gaming machine of claim 29, wherein each of the simulated mechanical reels includes shaded regions and provides a simulated motion blur to the images of a plurality of symbols during the simulated rotation of the simulated mechanical reels.

* * * * *